(12) United States Patent
Sun et al.

(10) Patent No.: US 10,498,629 B2
(45) Date of Patent: Dec. 3, 2019

(54) PRE— AND POST-SHARING INSIGHTS FOR SHARED CONTENT

(71) Applicant: Microsoft Technology Licensing, LLC, Redmond, WA (US)

(72) Inventors: William Jayang Sun, Berkeley, CA (US); Anca Simona Bateman, Walnut Creek, CA (US); Stacy Bloodworth, San Francisco, CA (US); Jiu-Ting Huang, Menlo Park, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 156 days.

(21) Appl. No.: 15/477,357

(22) Filed: Apr. 3, 2017

(65) Prior Publication Data

US 2018/0124004 A1    May 3, 2018

Related U.S. Application Data

(63) Continuation of application No. 15/379,609, filed on Dec. 15, 2016.
(Continued)

(51) Int. Cl.
*H04L 12/26* (2006.01)
*H04L 29/08* (2006.01)
(Continued)

(52) U.S. Cl.
CPC ............ *H04L 43/16* (2013.01); *G06F 16/285* (2019.01); *G06F 16/951* (2019.01);
(Continued)

(58) Field of Classification Search
CPC ....... H04L 43/045; H04L 43/16; H04L 51/24; H04L 51/32; H04L 67/02; H04L 67/26;
(Continued)

(56) References Cited

U.S. PATENT DOCUMENTS 8,327,012 B1 * 12/2012 Nguyen ........... H04N 21/23103
709/231
8,386,619 B2 * 2/2013 Mallet .................... G06Q 50/01
709/227
(Continued)

*Primary Examiner* — Michael C Lai
(74) *Attorney, Agent, or Firm* — Schwegman Lundberg & Woessner, P.A.

(57) ABSTRACT

This disclosure provides a system, method, and machine-readable memory for determining various pre-sharing insights and post-sharing insights. The system is configured to receive a request to share content with a first plurality of users represented as nodes in a graph associated with a first user. The system is also configured to determine a second plurality of users selected from the first plurality of users by traversing one or more nodes of the graph. The system further classifies the content to determine a plurality of topics for the content. The system then determines a third plurality of users selected from the second plurality of users by comparing the plurality of topics with user profile attribute values associated with each user of the second plurality of users. The system then communicates a notification to the first user that includes an identification of the third plurality of users.

14 Claims, 13 Drawing Sheets

Related U.S. Application Data

(60) Provisional application No. 62/414,965, filed on Oct. 31, 2016.

(51) Int. Cl.

| | | |
|---|---|---|
| *H04L 12/58* | (2006.01) | |
| *G06F 16/28* | (2019.01) | |
| *G06F 16/951* | (2019.01) | |
| *G06F 16/9535* | (2019.01) | |
| *G06F 16/955* | (2019.01) | |

(52) U.S. Cl.
CPC ...... *G06F 16/9535* (2019.01); *G06F 16/9566* (2019.01); *H04L 43/045* (2013.01); *H04L 51/24* (2013.01); *H04L 51/32* (2013.01); *H04L 67/26* (2013.01); *H04L 67/306* (2013.01); *H04L 67/02* (2013.01)

(58) Field of Classification Search
CPC ....... H04L 67/306; H04L 67/10; H04L 67/20; H04L 67/22; H04L 63/126; G06F 16/285; G06F 16/951; G06F 16/9535; G06F 16/9566; G06F 17/30864; H04W 4/21
See application file for complete search history.

(56) References Cited

U.S. PATENT DOCUMENTS

| | | | | |
|---|---|---|---|---|
| 8,392,526 | B2* | 3/2013 | Mallet | G06Q 50/01 709/217 |
| 8,412,772 | B1* | 4/2013 | Nguyen | H04N 21/23103 709/204 |
| 8,473,550 | B2* | 6/2013 | Nguyen | H04N 21/23103 709/204 |
| 8,621,019 | B2* | 12/2013 | Nguyen | H04N 21/23103 709/206 |
| 2014/0149888 | A1* | 5/2014 | Morris | G06F 15/16 715/753 |
| 2015/0350259 | A1* | 12/2015 | Garg | G06F 3/04842 709/203 |
| 2017/0213295 | A1* | 7/2017 | Kritzer | G06Q 50/01 |
| 2018/0032627 | A1* | 2/2018 | Margatan | H04L 67/02 |
| 2018/0174190 | A1* | 6/2018 | Ferreira | G06Q 30/0264 |
| 2018/0189288 | A1* | 7/2018 | Zhang | G06F 16/00 |

* cited by examiner

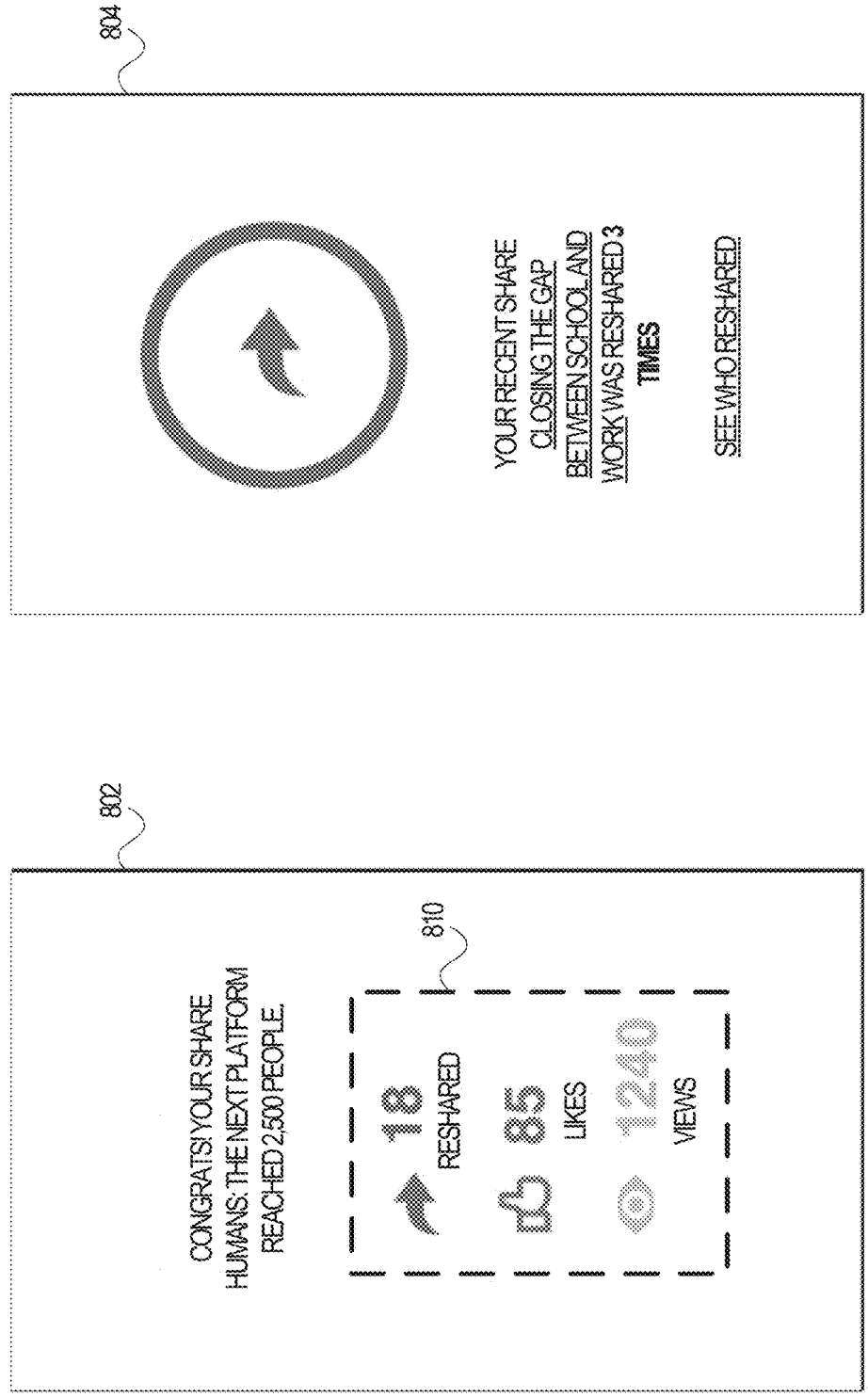

PRE— AND POST-SHARING INSIGHTS FOR SHARED CONTENT

CROSS-REFERENCE TO RELATED APPLICATIONS

This application claims the benefit of priority to U.S. Pat. App. No. 62/414,965, filed Oct. 31, 2016 and titled "PRE- AND POST-SHARING INSIGHTS FOR SHARED CONTENT," the disclosure of which is hereby incorporated by reference in its entirety. This application is also a continuation of U.S. patent application Ser. No. 15/379,609, filed Dec. 15, 2016 and titled "PRE- AND POST-SHARING INSIGHTS FOR SHARED CONTENT," the disclosure of which is hereby incorporated by reference in its entirety.

TECHNICAL FIELD

The subject matter disclosed herein generally relates to data processing of content to be shared with one or more users and, in particular, to determining a first plurality of data metrics prior to sharing the content with the one or more users and determining a second plurality of data metrics after the content is shared with the one or more users.

BACKGROUND

An online social networking service provides a platform whereby a member of the social networking service may connect with other members of the social networking service. The social networking service provides a number of services to the member, such as job seeking services, job hosting services, member profile services, job history services, resume building services, and other such services. The social networking service stores information provided by members in the course of interacting with these services in corresponding member profiles.

A social networking service typically allows members to share content with one another. However, this feature can result in the social networking service being flooded with content that has been previously shared by other members. This can be problematic, as a social networking service derives value from having members view new content, rather than content that has been previously seen.

In addition, a given member may desire to share content with his or her social network, but may be uncertain as to whether other members in his or her social network have already viewed such content. The content to be shared may be particularly relevant to the member's social network, but, without information as to whether other members have seen or viewed the content, the member may be reluctant to share it, thus depriving the members of his or her social network of the opportunity to engage with the content.

BRIEF DESCRIPTION OF THE DRAWINGS

Some embodiments are illustrated by way of example and not limitation in the figures of the accompanying drawings.

FIGS. 8A-8D illustrate examples of displayable content having post-sharing insights, according to example embodiments.

DETAILED DESCRIPTION

Figure 1:
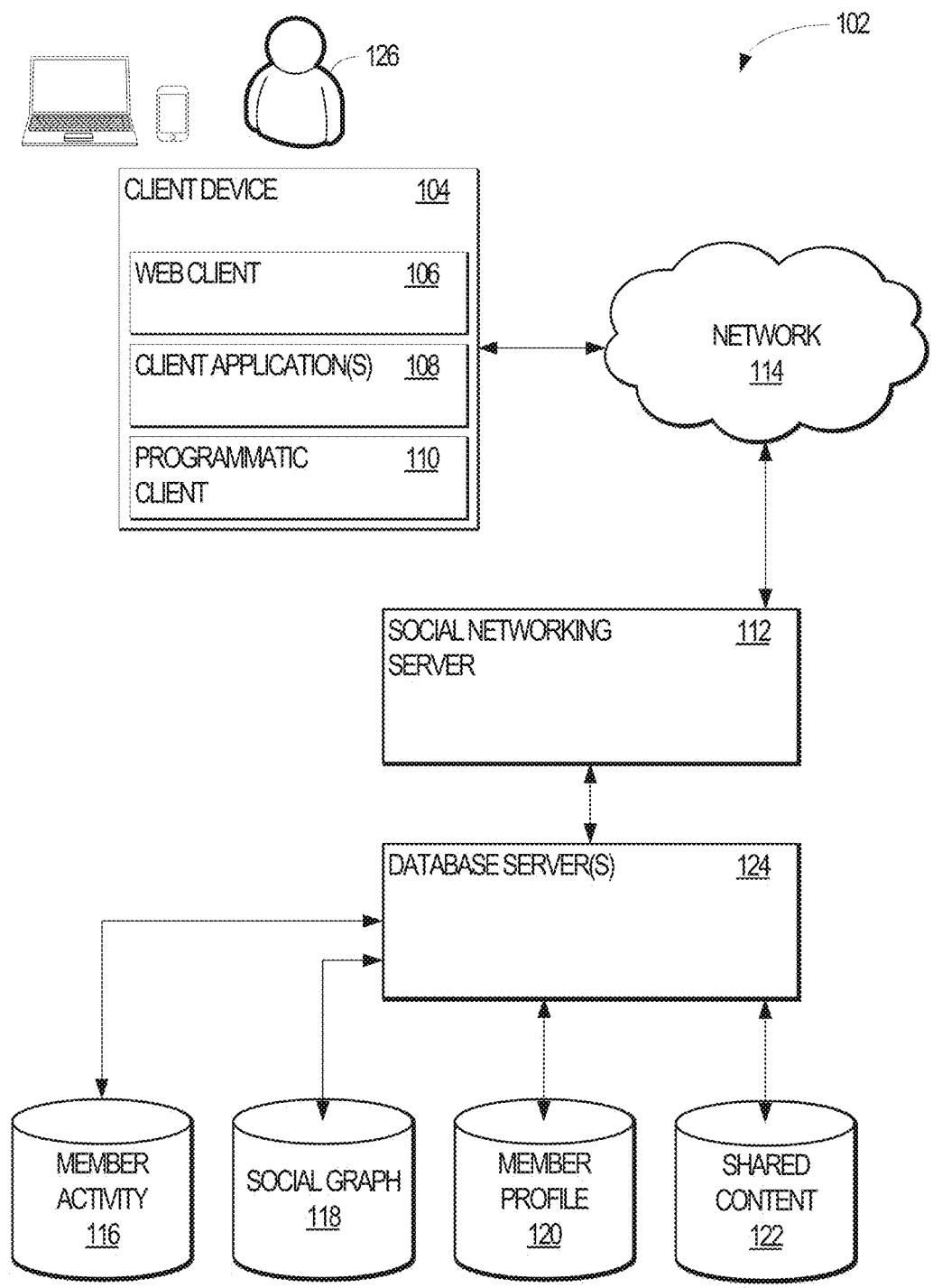
FIG. 1 is a block diagram illustrating a networked system, according to some example embodiments, including a social networking server.

Example methods and systems are directed to data processing of content to be shared with one or more users and, in particular, to determining a first plurality of data metrics prior to sharing the content with the one or more users and determining a second plurality of data metrics after the content is shared with the one or more users. In one embodiment, a social networking server provides a social networking service to one or more members. In addition, the social networking server includes various modules and engines that facilitate the sharing of content stored in an electronic format (e.g., content locally stored on a member's computing device) or content available via a Uniform Resource Location (URL) provided by a third-party service.

One value provided by a social networking service is that a member can disseminate (e.g., "share") content with other members in his or her social network. Sharing content allows a given member to inform other members in his or her social network about an item of interest (e.g., a news article, a product offering, a service offering) that may be relevant to the members in his or her social network. However, the given member may be hesitant about sharing a particular item of interest (e.g., the content to be shared), as the given member may not know whether other members in his or her social network have seen the item of interest or whether the item of interest will, in fact, be relevant. This uncertainty can be a powerful inhibitor of sharing the item of interest, as the given member may desire not to be seen as a copycat (e.g., in instances where the item of interest has already been viewed) or as an "over-sharer" (e.g., in instances where the item of interest is not relevant to members of the given member's social network). Where the given member is employed in an industry where reputation and knowledge are valued, being relevant and sharing new content can create new business or encourage other members to become clients of the given member.

Accordingly, this disclosure provides for various engines that help a given member determine whether content to be shared (e.g., an online news article, an image, a document in an electronic format, etc.) is, in fact, worth sharing. In one embodiment, this disclosure provides for a pre-sharing analytic engine that determines and/or generates various pre-sharing insight analytics, which can help the given member reach an informed decision about whether to share a particular item of interest. The process of determining and/or generating the pre-sharing insight analytics is further discussed with reference to FIG. 3, and examples of the pre-sharing insight analytics are discussed with reference to FIGS. 4-5.

In addition, it would be helpful to the given member to know the impact, if any, that sharing of the particular item of interest had on the given member's social network. This information would be helpful to the given member because it can inform the given member about the value he or she is providing to his or her social network. This information can also help the given member reach decisions about other types of content that he or she may wish to share with his or her social network. Accordingly, this disclosure also provides for a post-sharing analytic engine that determines and/or generates various post-sharing insight analytics, which can inform the given member about the impact he or she had in sharing the particular item of interest. The process of determining and/or generating the post-sharing insight analytics is further discussed with reference to FIG. 6, and examples of the post-sharing insight analytics are discussed with reference to FIGS. 7-8D.

With reference to FIG. 1, an example embodiment of a high-level client-server-based network architecture 102 is shown. A social networking server 112 provides server-side functionality via a network 114 (e.g., the Internet or a wide area network (WAN)) to one or more client devices 104. FIG. 1 illustrates, for example, a web client 106 (e.g., a browser, such as the Internet Explorer® browser developed by Microsoft® Corporation of Redmond, Wash. State), client application(s) 108, and a programmatic client 110 executing on the client device 104. The social networking server 112 is further communicatively coupled with one or more database servers 124 that provide access to one or more databases 116-122.

The client device 104 may comprise, but is not limited to, a mobile phone, desktop computer, laptop, portable digital assistant (PDA), smart phone, tablet, ultra book, netbook, laptop, multi-processor system, microprocessor-based or programmable consumer electronic system, or any other communication device that a user 126 may utilize to access the social networking server 112. In some embodiments, the client device 104 may comprise a display module (not shown) to display information (e.g., in the form of user interfaces). In further embodiments, the client device 104 may comprise one or more of touch screens, accelerometers, gyroscopes, cameras, microphones, global positioning system (GPS) devices, and so forth. The client device 104 may be a device of a user 126 that is used to perform one or more searches for user profiles accessible to, or maintained by, the social networking server 112. The client device 104 may also be configured to communicate content to and/or from the social networking server 112, such as content that is displayable on a web page provided by the social networking server 112.

In one embodiment, the social networking server 112 is a network-based appliance that responds to initialization requests or search queries from the client device 104. One or more users 126 may be a person, a machine, or another means of interacting with the client device 104. In various embodiments, the user 126 is not part of the network architecture 102, but may interact with the network architecture 102 via the client device 104 or another means. For example, one or more portions of the network 114 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a Wi-Fi® network, a WiMax network, another type of network, or a combination of two or more such networks.

The client device 104 may include one or more applications (also referred to as "apps") such as, but not limited to, a web browser, a messaging application, an electronic mail (email) application, a social networking access client, and the like. In some embodiments, if the social networking access client is included in the client device 104, then this application is configured to locally provide the user interface and at least some of the functionalities of a social networking service, with the application configured to communicate with the social networking server 112, on an as-needed basis, for data and/or processing capabilities not locally available (e.g., to access a member profile, to authenticate a user 126, to identify or locate other connected members, etc.). Conversely, if the social networking access client is not included in the client device 104, the client device 104 may use its web browser to access the initialization and/or search functionalities of the social networking server 112.

One or more users 126 may be a person, a machine, or another means of interacting with the client device 104. In example embodiments, the user 126 is not part of the network architecture 102, but may interact with the network architecture 102 via the client device 104 or other means. For instance, the user 126 provides input (e.g., touch screen input or alphanumeric input) to the client device 104 and the input is communicated to the social networking server 112 via the network 114. In this instance, the social networking server 112, in response to receiving the input from the user 126, communicates information to the client device 104 via the network 114 to be presented to the user 126. In this way, the user 126 can interact with the social networking server 112 using the client device 104.

Further, while the client-server-based network architecture 102 shown in FIG. 1 employs a client-server architecture, the present subject matter is of course not limited to such an architecture, and could equally well find application in a distributed, or peer-to-peer, architecture system, for example.

In addition to the client device 104, the social networking server 112 communicates with the one or more database server(s) 124 and/or database(s) 116-122. In one embodiment, the social networking server 112 is communicatively coupled to a member activity database 116, a social graph database 118, a member profile database 120, and a shared content database 122. The databases 116-122 may be implemented as one or more types of databases including, but not limited to, a hierarchical database, a relational database, an object-oriented database, one or more flat files, or combinations thereof.

The member profile database 120 stores member profile information about members who have registered with the social networking server 112. With regard to the member profile database 120, the member may include an individual person or an organization, such as a company, a corporation, a nonprofit organization, an educational institution, or other such organizations.

Consistent with some embodiments, when a person initially registers to become a member of the social networking service provided by the social networking server 112, the person is prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the member profile database 120. Similarly, when a representative of an organization initially registers the organization with the social networking service provided by the social networking server 112, the representative may be prompted to provide certain information about the organization. This information may be stored, for example, in the member profile database 120. In some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. In some embodiments, importing or otherwise accessing data from one or more externally hosted data sources may enhance profile data for both members and organizations. For instance, with companies in particular, financial data may be imported from one or more external data sources, and made part of a company's profile.

Members of the social networking service may establish connections with one or more other members and/or organizations of the social networking service. The connections may be defined as a social graph, where a vertex in the social graph represents the member and/or organization and the edges identify connections among vertices. In this regard, the edges may be bilateral (e.g., two members and/or organizations have agreed to form a connection), unilateral (e.g., one member has agreed to form a connection with another member), or combinations thereof. In this manner, members are said to be first-degree connections of each other where a single edge connects the vertices representing the members; otherwise, members are said to be "nth"-degree connections of each other where "n" is defined as the number of edges separating the two vertices representing the members. As an example, two members are said to be "2nd-degree" connections of each other where each member shares a connection in common with the other member, but the members are not directly connected to one another. In one embodiment, the social graph maintained by the social networking server 112 is stored in the social graph database 118.

Although the foregoing discussion refers to a "social graph" in the singular, one of ordinary skill in the art will recognize that the social graph database 118 may be configured to store multiple social graphs. For example, and without limitation, the social networking server 112 may maintain multiple social graphs, where each social graph corresponds to various geographic regions, industries, members, or combinations thereof.

As members interact with the social networking service provided by the social networking server 112, the social networking server 112 is configured to monitor these interactions. Examples of interactions include, but are not limited to, commenting on content posted by other members, viewing member profiles, editing or viewing a member's own profile, sharing content outside of the social networking service (e.g., an article provided by an entity other than the social networking server 112), updating a current status, posting content for other members to view and/or comment on, and other such interactions. In one embodiment, these interactions are stored in the member activity database 116, which associates interactions made by a member with his or her member profile stored in the member profile database 120.

The shared content database 122 stores information about content that has been shared by one or more members of the social networking service. In one embodiment, the shared content database 122 includes information about, and identifying, content shared by one or more members of the social networking service. In one embodiment, the shared content database 122 includes a two-dimensional, global content table, where each row of the global content table represents content that has been previously shared, and each column includes information about the shared content. The columns of the global content table may include, but are not limited to, a content identifier that identifies the content, a URL that identifies the location of the content, a member profile identifier that identifies the member profile that shared the content, and one or more columns that identify interactions with the content (e.g., the number of views, re-shares, likes, comments, and other such interactions) by other members of the social networking service.

With regard to the content identifier, this identifier may be generated from one or more features of the content associated with the identifier, such as the URL of the content, the binary data of the content, and other such features. One example of a content identifier is an MD5 hash, which may be calculated from the URL associated with the content or from the binary data of the content. The MD5 hash can serve as a unique identifier of the content that the social networking server 112 uses to determine whether other members of the social networking service have shared, viewed, or otherwise interacted with the same content previously. In this manner, different rows of the global content table may each have the same content identifier, such as where different members of the social networking service have shared the same content, either from the same URL or where the content includes the same binary data.

With regard to the member profile identifier, this identifier may be unique to a given member profile, such that each member profile of the social networking service has a different member profile identifier. In addition, the social networking server 112 can use the member profile identifier to determine which members of the social networking service have previously shared a particular item of content. For example, by first determining the content identifier, and then requesting the member profile identifiers associated with the same content identifier (e.g., through a Structured Query Language (SQL) query), the social networking server 112 can then reference the member profile database 120 with the obtained member profile identifiers to identify, with particularity, those members who have previously shared a given item of content.

In addition to the global content table in the shared content database 122, the social networking server 112 may implement a content-specific table for a particular item of content that is shared by a given member of the social networking service. The content-specific table may be associated with the member profile identifier of the member who shared the particular item of content represented by the content-specific table. In this manner, a member profile identifier may be associated with different content-specific tables, depending on the amount of content a particular member of the social networking service shares with other members.

In one embodiment, the content-specific table stores particular interactions by members of the social networking service with the corresponding content. For example, the content-specific table may include rows that represent member profiles, and columns that represent different interactions (e.g., views, likes, re-shares, comments, etc.). As a given member interacts with a particular item of content, the social networking server 112 updates the global content table and the content-specific table to indicate the member profile that interacted with the particular item of content and the type of interaction. Further still, the social networking server 112 can reference the member profile that shared the particular item of content (the "sharing member profile") and update the particular row in the global content table and/or content-specific table associated with the sharing member profile.

While the foregoing description is directed to an embodiment of the shared content database 122 being implemented as two-dimensional tables, other logical constructs for organizing the shared content and member profile interactions are also contemplated as falling within the scope of this disclosure. For example, the social networking server 112 may implement one-dimensional arrays, two-dimensional arrays, one-dimensional tables, flat files, or other such logical constructs for organizing the shared content and member profile interactions. In this manner, the social networking server 112 is configured to monitor content having been shared by a sharing member, whether such content has been shared previously, and the interactions of other members of the social networking service relative to the content shared by the sharing member.

In one embodiment, the social networking server 112 communicates with the various databases 116-122 through the one or more database server(s) 124. In this regard, the database server(s) 124 provide one or more interfaces and/or services for providing content to, modifying content in, removing content from, or otherwise interacting with the databases 116-122. For example, and without limitation, such interfaces and/or services may include one or more Application Programming Interfaces (APIs), one or more services provided via a Service-Oriented Architecture (SOA), one or more services provided via a REST-Oriented Architecture (ROA), or combinations thereof. In an alternative embodiment, the social networking server 112 communicates directly with the databases 116-122 and includes a database client, engine, and/or module for providing data to, modifying data stored within, and/or retrieving data from the one or more databases 116-122.

While the database server(s) 124 are illustrated as a single block, one of ordinary skill in the art will recognize that the database server(s) 124 may include one or more such servers. For example, the database server(s) 124 may include, but are not limited to, a Microsoft Exchange Server, a Microsoft® Sharepoint® Server, a Lightweight Directory Access Protocol (LDAP) server, a MySQL database server, or any other server configured to provide access to one or more of the databases 116-122, or combinations thereof. Accordingly, and in one embodiment, the database server(s) 124 implemented by the social networking service are further configured to communicate with the social networking server 112.

Figure 2:
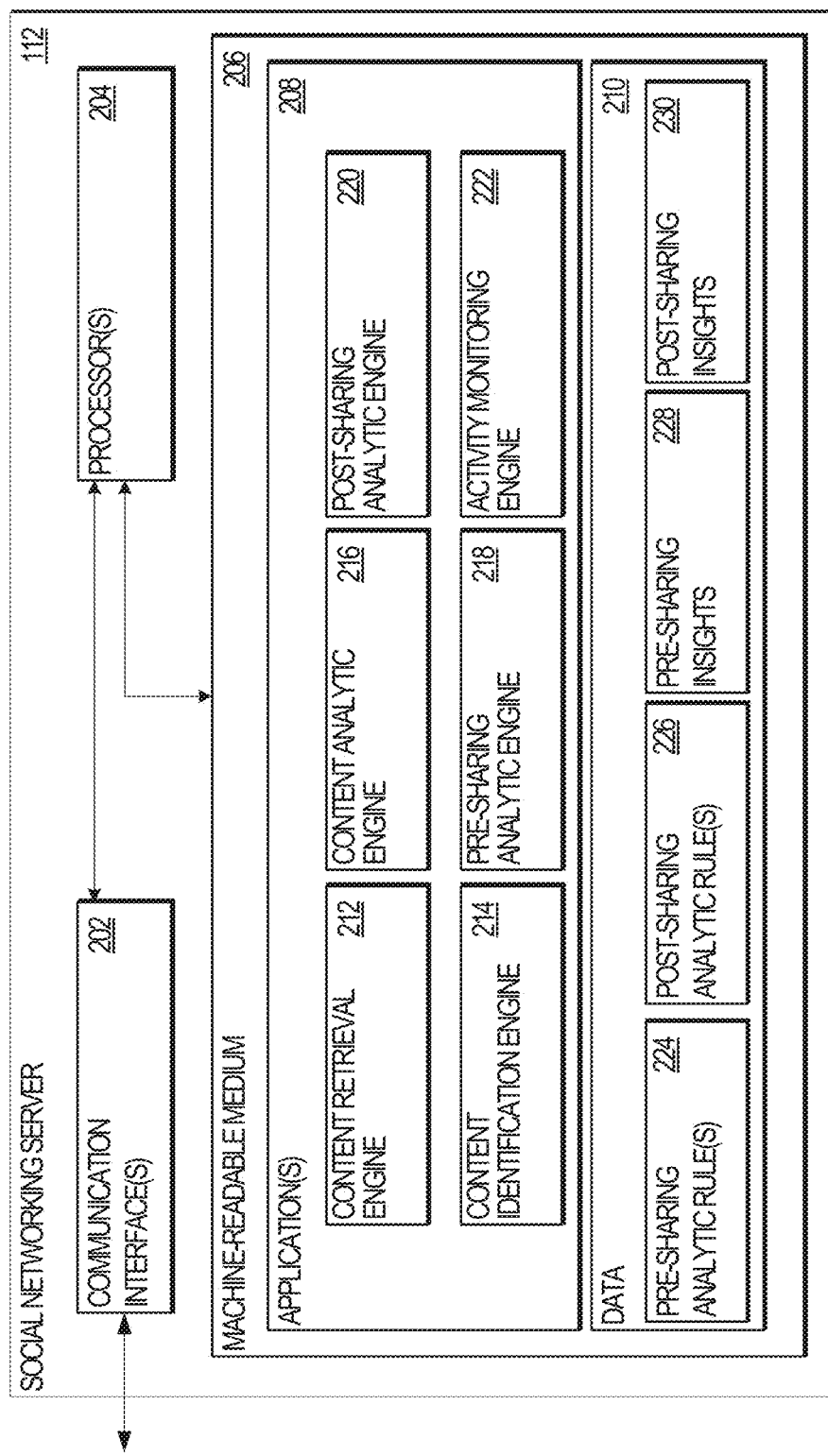
FIG. 2 illustrates the social networking server of FIG. 1, according to an example embodiment.

FIG. 2 illustrates the social networking server 112 of FIG. 1, according to an example embodiment. In one embodiment, the social networking server 112 includes one or more processor(s) 204, one or more communication interface(s) 202, and a machine-readable medium 206 that stores computer-executable instructions for one or more applications 208 and data 210 used to support one or more functionalities of the applications 208.

The various functional components of the social networking server 112 may reside on a single device or may be distributed across several computers in various arrangements. The various components of the social networking server 112 may, furthermore, access one or more databases (e.g., databases 116-122 or any of data 210), and the various components of the social networking server 112 may be in communication with one another. Further, while the components of FIG. 2 are discussed in the singular sense, it will be appreciated that in other embodiments multiple instances of the components may be employed.

The one or more processors 204 may be any type of commercially available processor, such as processors available from the Intel Corporation, Advanced Micro Devices, or Texas Instruments, or other such processors. Further still, the one or more processors 204 may include one or more special-purpose processors, such as a Field-Programmable Gate Array (FPGA) or an Application-Specific Integrated Circuit (ASIC). The one or more processors 204 may also include programmable logic or circuitry that is temporarily configured by software to perform certain operations. Thus, once configured by such software, the one or more processors 204 become specific machines (or specific components of a machine) uniquely tailored to perform the configured functions and are no longer general-purpose processors.

The one or more communication interfaces 202 are configured to facilitate communications among the client device 104, the social networking server 112, and one or more of the database server(s) 124 and/or databases 116-122. The one or more communication interfaces 202 may include one or more wired interfaces (e.g., an Ethernet interface, a Universal Serial Bus (USB) interface, a Thunderbolt® interface, etc.), one or more wireless interfaces (e.g., an IEEE 802.11b/g/n interface, a Bluetooth® interface, an IEEE 802.16 interface, etc.), or combinations of such wired and wireless interfaces.

The machine-readable medium 206 includes various applications 208 and data 210 for implementing the social networking server 112. The machine-readable medium 206 includes one or more devices configured to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the applications 208 and the data 210. Accordingly, the machine-readable medium 206 may be implemented as a single storage apparatus or device, or, alternatively and/or additionally, as "cloud-based" storage systems or storage networks that include multiple storage apparatus or devices. As shown in FIG. 2, the machine-readable medium 206 excludes signals per se.

In one embodiment, the applications 208 are written in a computer-programming and/or scripting language. Examples of such languages include, but are not limited to, C, C++, C#, Java, JavaScript, Perl, Python, or any other computer-programming and/or scripting language now known or later developed.

With reference to FIG. 2, the applications 208 of the social networking server 112 include, but are not limited to, a content retrieval engine 212, a content identification engine 214, a content analytic engine 216, a pre-sharing analytic engine 218, a post-sharing analytic engine 220, and an activity monitoring engine 222. While the social networking server 112 may include alternative and/or additional applications (e.g., a networking application, a printing application, a software-implemented keyboard, etc.), such alternative and/or additional applications are not germane to this disclosure and the discussion of such is hereby omitted for brevity and readability.

The data 210 referenced and used by the applications 208 include various types of data in support of determining and/or generating pre-sharing insights and post-sharing insights. In one embodiment, the data 210 includes, but is not limited to, one or more pre-sharing analytic rule(s) 224, one or more post-sharing analytic rule(s) 226, one or more pre-sharing insights 228, and one or more post-sharing insights 230. In addition, and while such information is not shown as data 210, the data 210 may also include information accessible from one or more of the databases 116-122 as illustrated in FIG. 1.

The content retrieval engine 212 is configured to retrieve content shared by one or more of the members of the social networking service. In one embodiment, the social networking server 112 provides a graphical user interface (e.g., a webpage) that facilitates interaction between members of the social networking service and one or more client devices 104. As known to one of ordinary skill in the art, the graphical user interface may include a graphical element that a member selects (e.g., via a mouse) to share content with other members. For example, the webpage may be written in the Hypertext Markup Language (HTML) and may implement such methods as the POST method for transferring content to the social networking server 112. Additional methods that may be implemented by the webpage are described in the non-patent literature "HTTP/1.1," RFC 2616, Internet Engineering Task Force, June 1999.

In response to selection of the graphical element displayed on the webpage, a prompt may be displayed to the member to identify and/or provide the content to share via the social networking server 112. In one embodiment, the social networking server 112 implements different mechanisms for members of the social networking service to share content, depending on whether the content is provided by the member or by a third-party website (e.g., a website provided by an entity other than the member or the social networking service). Where a third-party website provides the content that the member desires to share, the social networking server 112 is configured to accept a location identifier, such as a URL, which identifies the content to be shared. In this example, the member submits the URL to the social networking server 112 via the aforementioned webpage. In response, the content retrieval engine 212 is configured to retrieve the content identified by the URL. In one embodiment, the content retrieval engine 212 retrieves the content identified by the member-provided URL using one or more methods as described by RFC 2616. To retrieve the identified content, the content retrieval engine 212 may communicate with the third-party website using one or more communication protocols, such as the Hypertext Transfer Protocol (HTTP).

The content retrieved by the content retrieval engine 212 may include such content as a webpage and the multimedia content referenced and/or displayed by the webpage, such as image(s), sound(s), video(s), electronic documents, and other such multimedia content. For a webpage, the content may also include computer-executable files referenced by the webpage, such as external JavaScript files. The content may also include an image, a sound, a video, an electronic document, or other types of content provided in a computer-readable format (e.g., PDF, GIF, PNG, MP4, etc.).

Additionally and/or alternatively, the content to be shared may be provided by the member. For example, the webpage displayed to the member may include one or more input elements that allow the member to provide text to be shared with other members of the social networking service. The webpage may also include an input element that allows the member to identify locally stored content (e.g., content that the member is able to access locally) and upload such locally stored content to the social networking server 112. Examples of locally stored content include, but are not limited to, electronic documents, computer-readable files, multimedia files, and other such content. In this manner, the member provides the content directly to the social networking server 112 rather than instructing the social networking server 112 to retrieve the content to be shared from a third-party provider.

The content identification engine 214 is configured to assign an identifier to the content provided, or identified by, the member desiring to share such content. Accordingly, in one embodiment, the content retrieval engine 212 and/or the social networking server 112 is configured to invoke and/or instantiate the content identification engine 214 when the content identified by the member is retrieved or when the content provided by the member is uploaded. In one embodiment, the content identification engine 214 assigns a content identifier that is unique to the content to be shared. The content identification engine 214 may invoke one or more cryptographic hashing functions to determine the content identifier for the content to be shared, such as an MD5 hash function, an MD6 hash algorithm, a SHA-1 hash function, or any other such cryptographic hash function now known or later developed.

In one embodiment, the content identification engine 214 uses different characteristics of the content to be shared as input to the cryptographic hash function in determining the corresponding content identifier. In particular, and without limitation, the content identification engine 214 uses a different characteristic of the content to be shared depending on the manner in which such content was provided to the social networking server 112. Where the content to be shared is associated with a URL (e.g., a URL provided by the member), the content identification engine 214 determines the content identifier using the provided URL as input to the cryptographic hash function. In this manner, where two members desire to share content identified by the same URL, the resulting hash value is the same for the shared content having the same URL.

Additionally, and/or alternatively, the content identification engine 214 may forego the use of a cryptographic hash function in assigning a content identifier to content shared via a member-provided URL. Instead, the content identification engine 214 may use the provided URL as the content identifier for the shared content. In this manner, when a URL is received from a member who desires to share content via the social networking server 112, the content identification engine 214 is configured to compare the received URL with previously received URLs, and determine whether the currently received URL has been previously received.

The content identification engine 214 may also use the electronic file of the content to be shared as the input to the cryptographic hash function to obtain the corresponding content identifier. In particular, and in one embodiment, the content identification engine 214 maintains a list and/or database table of electronic file types indicating which types of electronic files are to be provided as input to the cryptographic hash function. Examples of such file types include image file types (e.g., GIF, JPEG, PNG, BMP, etc.), audio file types (e.g., WAV, MP3, M4A, FLAC, etc.), movie file types (e.g., FLV, MOV, AVI, MKV, etc.), document file types (e.g., TXT, PDF, DOC, RTF, etc.), and other such file types or combinations of such file types. The technical benefit of using the electronic file itself as the input to the cryptographic hash function is that the resulting hash output is unique to the electronic file. Thus, the same two electronic document files or the same two electronic image files have the same corresponding hash. As the same electronic file may be stored at different URLs (e.g., a first webpage has a hyperlink to the electronic file and a second webpage has a different hyperlink to the same electronic file), the use of the electronic file itself as the input to the cryptographic hash function helps the content identification engine 214 determine whether the same electronic file is being shared, even if the same electronic file is referenced by different URLs.

This implementation may also be leveraged where the member uploads content to the social networking server 112, rather than identifying a URL where the content may be located. In this manner, where a first member uploads content to be shared to the social networking server 112, the content identification engine 214 uses the uploaded content as the input to the cryptographic hash function to determine the corresponding content identifier. The corresponding content identifier can then be used as a proxy in comparing the shared content with previously shared content by other members of the social networking service. To be more specific, the corresponding content identifier of the recently uploaded content is compared with corresponding content identifiers of previously uploaded content.

Although the foregoing description of the content identification engine 214 focuses on the use of a cryptographic hash function in implementing the content identification engine 214, the content identification engine 214 may use other techniques for determining a content identifier for shared content. For example, and without limitation, the content identification engine 214 may assign randomly generated and/or unique numbers or other sequence of alphanumeric characters to the shared content.

The content analytic engine 216 is configured to initially analyze the content to be shared provided by the member. In one embodiment, the content analytic engine 216 is configured to determine whether the content to be shared has been previously shared (e.g., by other members of the social networking service). In addition, the content analytic engine 216 is configured to assign one or more topics to the content to be shared, which are then used to determine whether the content to be shared would be relevant to other members of the sharing member's social network.

As discussed previously, the content identification engine 214 is configured to assign a content identifier to provided content. The content analytic engine 216 is configured to retrieve one or more content identifiers from the shared content database 122, and to compare the retrieved one or more content identifiers with the content identifier of the content to be shared.

The scope of the comparison of the content identifiers may vary according to the configuration of the content analytic engine 216. In one embodiment, the content analytic engine 216 is configured to perform a global comparison of the content identifier associated with the content to be shared. In this embodiment, the content analytic engine 216 compares the content identifier with content identifiers retrieved from the global content table of the shared content database 122. In this manner, in response to a member providing content to be shared to the social networking server 112, the content analytic engine 216 is configured to inform the member whether other members of the social networking service have already shared the content.

Additionally, and/or alternatively, the content analytic engine 216 may be configured to limit the scope of the comparison of the content identifiers. In one embodiment, the scope of the comparison is defined as the members who are part of the sharing member's social graph. To determine which members are part of the sharing member's social graph, the content analytic engine 216 references and/or queries the social graph database 118 using the member profile identifier assigned to the sharing member. In turn, the social graph database 118 communicates and/or outputs an identification of those members who are within the sharing member's social graph, which may include first-degree connections, second-degree connections, followers of the sharing member, and other such connections or combinations of connections within the sharing member's social graph. In one embodiment, the output includes the member profile identifiers of the members who are within the sharing member's social graph.

The content analytic engine 216 may be configured to have a configurable upper bound on the number of degrees to which connections to the sharing member are analyzed. For example, the upper bound may be second-degree connections, in which case the content analytic engine 216 analyzes the first- and second-degree connections of the sharing member. Additionally, and/or alternatively, the sharing member may specify the scope of the comparison by indicating which members within the sharing member's social graph are to be included in the comparison (e.g., via a webpage displayable to the sharing member).

Using the obtained member profile identifiers, the content analytic engine 216 may then query the shared content database 122 to obtain a listing of the content (e.g., the content identifiers) that the members associated with the member profile identifiers have previously shared. The content analytic engine 216 may then compare the content identifiers associated with the previously shared content with the content identifier of the content to be shared by the sharing member. As the content analytic engine 216 compares the previously shared content identifiers and the content identifier of the content to be shared, the content analytic engine 216 records each time the content identifiers match. For example, the content analytic engine 216 may store this value as a prior share content counter. At the end of this comparison, the content analytic engine 216 communicates the prior share content counter to the client device 104, and the prior share content counter may be displayed via a webpage displayable by the client device 104. In addition to the prior share content counter, the content analytic engine 216 may also communicate the names of the members who have previously shared the content to be shared (e.g., by communicating the names of the members associated with the obtained member profile identifiers). In this manner, the sharing member is able to ascertain the number of times the content to be shared has been shared previously and/or the members who have previously shared such content.

In addition, the content analytic engine 216 may be configured to determine those member profiles that have previously viewed, or otherwise interacted with, the content to be shared or, conversely, determine those member profiles that have not previously viewed, or otherwise interacted with, the content to be shared. In one embodiment, the content analytic engine 216 determines these member profiles by referencing the social graph of the sharing member (via the social graph database 118) and obtaining a listing of member profile identifiers corresponding to members who are within predetermined number of degrees from the sharing member (e.g., first-degree connections, second-degree connections, and so forth). The content analytic engine 216 then references the member activity database 116 and/or the shared content database 122 with the obtained listing of member profile identifiers and the content identifier assigned to the content to be shared. In one embodiment, the member activity database 116 includes interactions by members of the social networking service, where the interactions are associated with content identifiers (to identify the content interacted with) and interaction identifiers (to indicate the type of interaction).

Where the member activity database 116 returns a NULL or EMPTY value for a given member profile identifier and content identifier pairing, the content analytic engine 216 records the member profile identifier and the member name associated with the member profile identifier as a connection of the sharing member who has not yet seen the content to be shared. Similarly, where the member activity database 116 returns a non-empty value, indicating that the given member profile identifier and content identifier pairing occurs within the member activity database 116, the content analytic engine 216 records the member profile identifier and the member name associated with the member profile identifier as a connection of the sharing member who has seen, or otherwise interacted with, the content to be shared. In this manner, the content analytic engine 216 is configured to compile a listing of member profiles within the sharing member's social graph associated with members who have seen, or not seen, the content to be shared. Using this listing, the content analytic engine 216 is further configured to calculate one or more metrics, such as the percentage of members who have not yet seen the content to be shared, the percentage of members who have seen the content to be shared, an absolute number of members who have seen or not yet seen the content to be shared, and other such metrics. The computation and calculations of these metrics are within the skillset of one of ordinary skill in the art and would be understood by those who engage in statistical calculations.

The content analytic engine 216 is also configured to assign topics to the content to be shared. As discussed below, by associating the content to be shared with identified topics, the content analytic engine 216 enables the pre-sharing analytic engine 218 to provide a variety of metrics relating to the content to be shared and potential members who may find such content relevant.

In assigning topics to the content to be shared, the content analytic engine 216 may query a topic database 304 (illustrated in FIG. 3, discussed below) to obtain assignable topics. In one embodiment, the topic database 304 includes a variety of topics relating to one or more attribute values that are assignable to member profiles stored in the member profile database 120. Such topics may include Employment attribute values (e.g., "director," "attorney," "doctor," "five years," "large company," etc.), Industry attribute values (e.g., "electronics," "fiber optics," "manufacturing," etc.), Geographic attribute values (e.g., "California," "New York City," "Silicon Valley," etc.), Skill attribute values (e.g., "technical writing," "programming," "contract review," etc.), and other such attribute values or combinations of attribute values. The content analytic engine 216 may assign the topics retrieved from the topic database 304 by implementing one or more classification techniques, which are then performed on the content to be shared. These classification techniques include, but are not limited to, supervised and/or unsupervised machine learning techniques, such as support vector machines, linear regression, k-nearest neighbor, naïve Bayes, and other such classification techniques or combinations of such techniques.

Furthermore, such classification techniques may be applied to many different types of content to be shared, such as text, images, audio, and other such types of content. Depending on the type of content to be shared, the content analytic engine 216 may take different actions to apply a given classification technique. For example, where the content to be shared is an image, the content analytic engine 216 may apply a given classification technique to a histogram of the image, where the histograms are represented as vectors normalized to a unit Euclidean norm. Where the content to be shared includes both image(s) and text, the content analytic engine 216 may apply one or more classification techniques to the different types of media (e.g., the text and/or the image(s)) of the content to be shared. Thus, regardless of the type of content to be shared that is provided by the sharing member, the content analytic engine 216 applies one or more classifications (e.g., topics selected from a topic database) to the content to be shared.

The content analytic engine 216 communicates the topics assigned to the content to be shared to the pre-sharing analytic engine 218. In one embodiment, the pre-sharing analytic engine 218 is configured to identify members of the sharing member's social graph who may find the content to be shared relevant and/or interesting. In performing this function, the pre-sharing analytic engine 218 may first retrieve the social graph associated with the sharing member's profile from the social graph database 118. The pre-sharing analytic engine 218 then traverses various edges of the retrieved social graph to obtain a listing of the members (represented as nodes) within the sharing member's social graph. In one embodiment, the pre-sharing analytic engine 218 is configured with one or more pre-sharing analytic rule(s) 224 that instruct the pre-sharing analytic engine 218 as to the depth of the social graph that the pre-sharing analytic engine 218 should traverse. For example, the pre-sharing analytic rule(s) 224 may instruct the pre-sharing analytic engine 218 to obtain a listing of a sharing member's connections up to, and including, first-degree connections, second-degree connections, third-degree connections, and so forth. In this manner, by limiting the number of degrees of connections to include in the analysis, the pre-sharing analytic rule(s) 224 prevent the pre-sharing analytic engine 218 from endlessly traversing a social graph associated with the sharing member.

Using the identified members, the pre-sharing analytic engine 218 then queries the member profile database 120 to obtain one or more member profiles corresponding to the identified members. For each member profile of the obtained member profiles, the pre-sharing analytic engine 218 then compares the topics assigned to the content to be shared with one or more member profile attribute values associated with the corresponding member profile. In one embodiment, the pre-sharing analytic rule(s) 224 instruct the pre-sharing analytic engine 218 which of the member profile attribute values to compare with the topics assigned to the content to be shared, such as Employment attribute values, Industry attribute values, Geographic attribute values, and other such attribute values or combinations of attribute values.

In comparing the topics assigned to the content to be shared with one or more attribute values of the obtained member profiles, the pre-sharing analytic engine 218 determines whether any of the member profiles include one or more attribute values that match, or correspond to, one or more of the topics assigned to the content to be shared. The purpose of this comparison is to determine whether any of the members associated with the member profiles would find the content to be shared relevant to his or her interests. In one embodiment, the pre-sharing analytic rule(s) 224 instruct the pre-sharing analytic engine 218 when there is a likelihood that the member would find the content to be shared relevant. For example, the pre-sharing analytic rule(s) 224 may include a first rule that states that a given member may find the content to be shared relevant when there is at least one match between an attribute value associated with the member's profile and a topic assigned to the content to be shared. As another example, the pre-sharing analytic rule(s) 224 may include a second, or alternative, rule that states that a given member may find the content to be shared relevant when there is a threshold number (e.g., a percentage or absolute value) of attribute values that match with the topics assigned to the content to be shared. In either embodiment, the pre-sharing analytic engine 218 may perform the comparison of the topics assigned to the content to be shared with different combinations of member profile attributes (e.g., with Industry and Skills attributes) or with a singular member profile attribute (e.g., with only the Skills attribute). The pre-sharing analytic engine 218 may also implement the pre-sharing analytic rule(s) 224 either singularly or in combination.

In determining matches between the members associated with the obtained member profiles and the content to be shared, the pre-sharing analytic engine 218 may record one or more pre-sharing insights 228 based on the comparison of the member profile attribute values and the topics assigned to the content to be shared. In one embodiment, the pre-sharing analytic engine 218 records the number of member profiles that are determined to be matches with the topics assigned to the content to be shared (e.g., by having a member profile attribute value match with at least one topic and/or by having a threshold number of member profile attribute values match with one or more topics).

Additionally, and/or alternatively, the pre-sharing analytic engine 218 records the number of member profiles associated with a particular member profile attribute (e.g., Employment, Industry, Geographic, etc.) that are determined to be matches with the topics assigned to the content to be shared. For example, the pre-sharing analytic rule(s) 224 may include a rule that instructs the pre-sharing analytic engine 218 to record and/or store a count and/or listing of those member profiles associated with particular Industry attribute values. In this example, the pre-sharing analytic engine 218 maintains one or more groupings (e.g., arrays or other logical constructs) of those member profiles that have a common Industry attribute value. Continuing with this example, the pre-sharing analytic engine 218 may record that a first group of member profiles includes those that have a common Industry attribute value, a second group of member profiles includes those that have a common Employee attribute value, and so forth. In this manner, the pre-sharing analytic engine 218 is configured to maintain a record of groupings of member profiles that have one or more attribute values that match the topics assigned to the content to be shared.

The pre-sharing analytic engine 218 is configured to communicate the pre-sharing insights 228 to the sharing member for display on a webpage or other graphical user interface. As discussed below with reference to FIGS. 4-5, the pre-sharing insights 228 may be displayed as elements (e.g., graphics and/or text) on an interface for interacting with the social networking server 112, such as a webpage.

Figure 3:
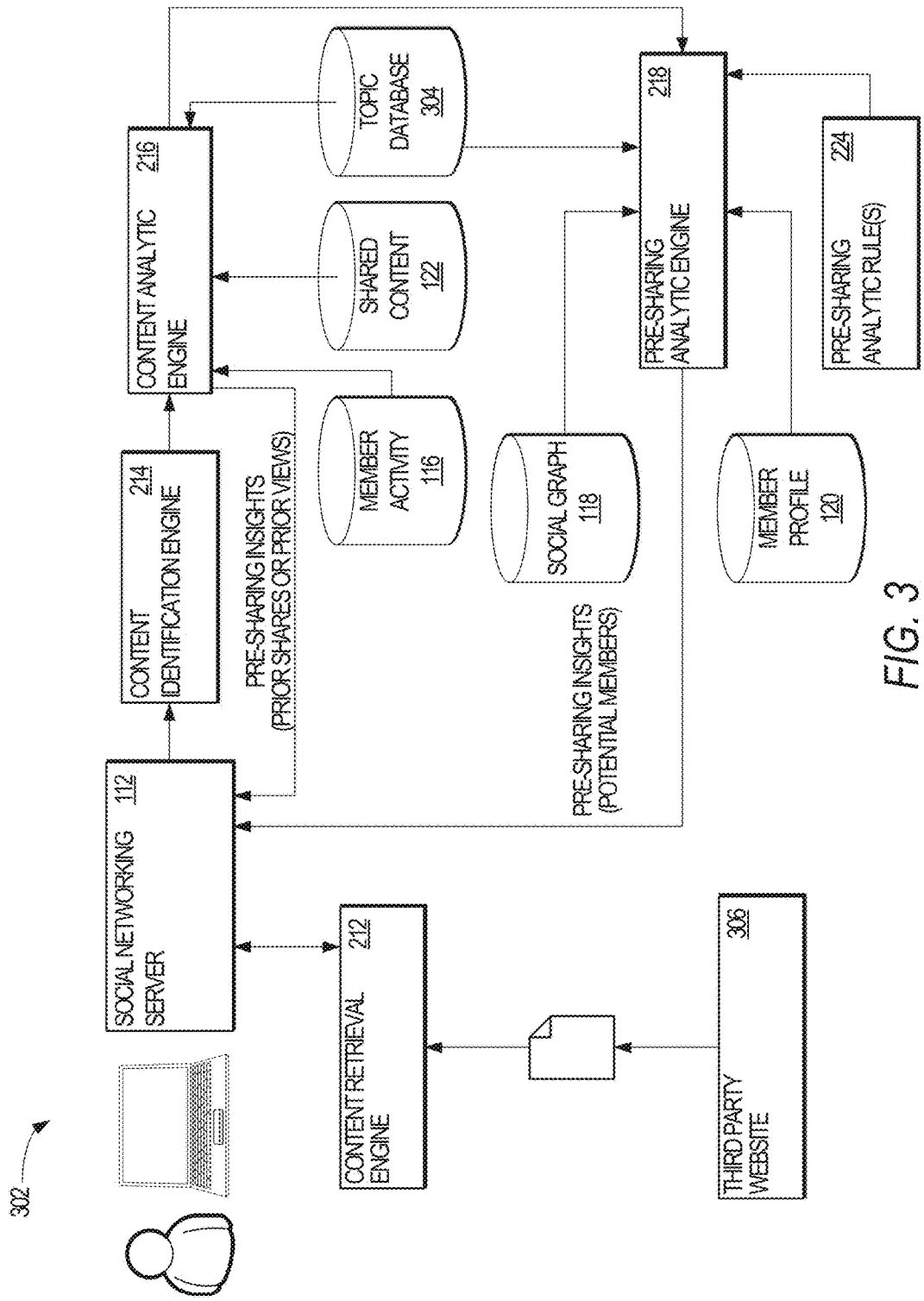
FIG. 3 illustrates a process of generating pre-sharing insight analytics using the various components of the social networking server of FIG. 2, according to an example embodiment.

FIG. 3 illustrates a process 302 of generating pre-sharing insight analytics using the various components of the social networking server 112 of FIG. 2, according to an example embodiment. As shown in FIG. 3, the process 302 includes a user 126 interacting with the social networking server 112 to share content available from a third-party website 306. As discussed above, the content retrieval engine 212 is configured to retrieve the content from the third-party website 306 and communicate such content to the content identification engine 214. Alternatively, the user 126 may have provided the content to the social networking server 112 by uploading such content using one or more communication protocols, such as HTTP, the file transfer protocol (FTP), and other such communication protocols.

The social networking server 112 then executes the content identification engine 214, which assigns a content identifier to the content to be shared. The content analytic engine 216 then performs an initial analysis of the content to be shared, such as determining those members within the user's 126 social graph who may have previously shared the content to be shared, determining those members within the user's 126 social graph who may have viewed or interacted with the content to be shared, determining those members within the user's 126 social graph who may have not yet viewed or interacted with the content to be shared, and assigning topics (e.g., classifications) to the content to be shared. As explained above, the content analytic engine 216 may reference one or more databases in making these determinations including, but not limited to, the member activity database 116, the shared content database 122, and a topic database 304. These initial determinations, referenced as "pre-sharing insights," are then communicated to the user 126 via the social networking server 112 and the client device that the user 126 is using to interact with the social networking server 112.

The pre-sharing analytic engine 218 then determines additional metrics (e.g., pre-sharing insights) using the topics assigned by the content analytic engine 216. In one embodiment, the pre-sharing analytic engine 218 determines which members of the user's 126 social graph may find the content to be shared relevant to their interests. As discussed above, the pre-sharing analytic engine 218 may perform this determination by comparing one or more member profile attribute values of the members' profiles with one or more topics assigned to the content to be shared. In addition, the pre-sharing analytic engine 218 is configured to segment these members according to one or more member profile attributes, such as Employment, Skills, Geographic, Education, and other such member profile attributes. As discussed above, the manner in which these members are grouped may be dictated by one or more pre-sharing analytic rule(s) 224. In this manner, the pre-sharing analytic engine 218 determines members within the user's 126 social graph who may find the content to be shared relevant and groupings for those members. These determinations, also called "pre-sharing insights," are then communicated to the user 126 via the social networking server 112 and the client device that the user 126 is using to interact with the social networking server 112.

Figure 4:
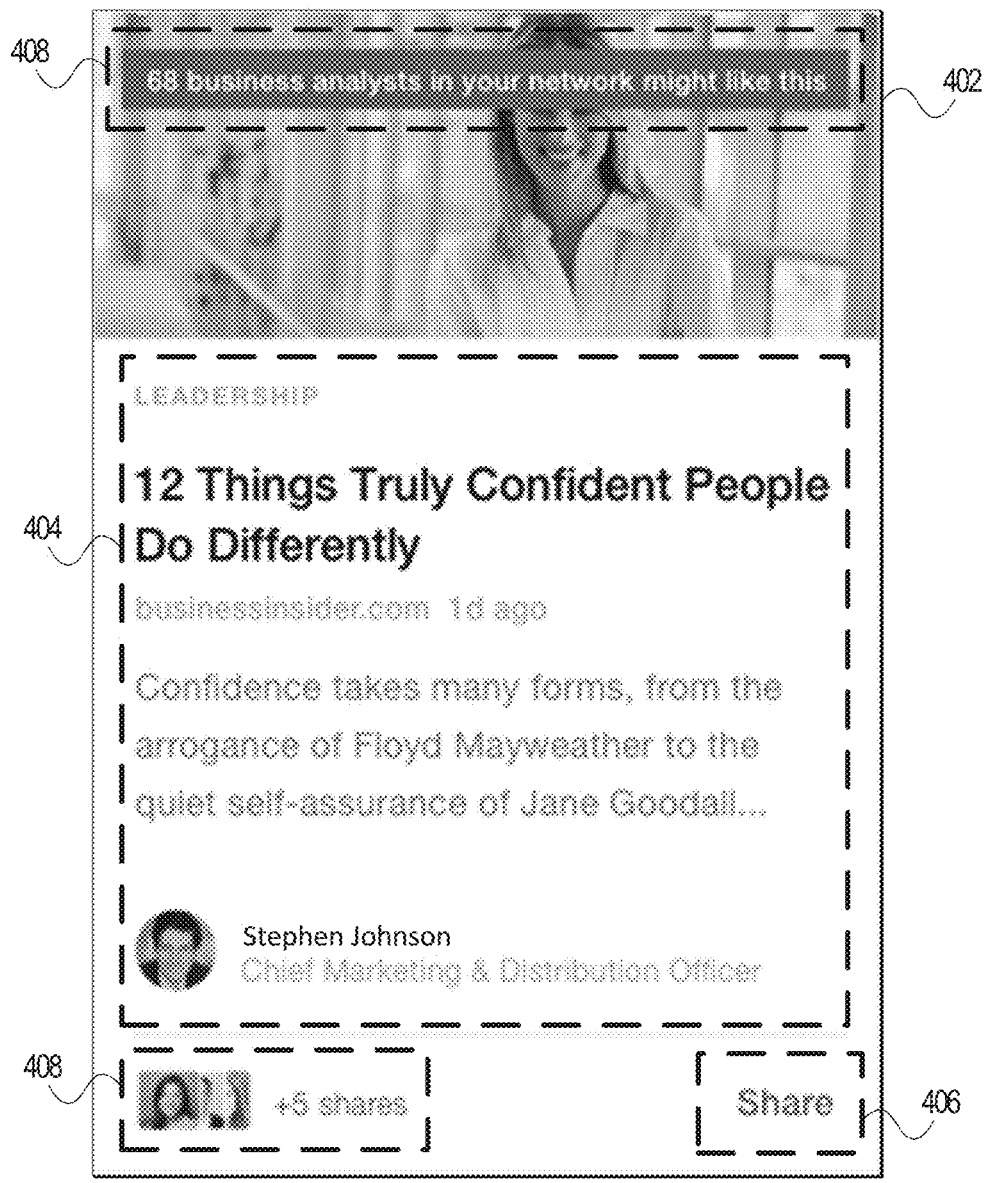
FIG. 4 illustrates a first example of a portion of a graphical user interface having pre-sharing insights, according to an example embodiment.

FIG. 4 illustrates a first example of a portion 402 of a graphical user interface having pre-sharing insights 408, according to an example embodiment. As shown in FIG. 4, the portion 402 is from a larger webpage that a sharing member may use to interact with the social networking server 112. This portion 402 may be displayed by an application, such as a web browser, being executed by the client device of the sharing member. The portion 402 shown in FIG. 4 depicts content 404 that the member intends to share. In the example shown, the content 404 is a news article obtainable from the website "businessinsider.com." The portion 402 also includes an element 406 that the sharing member can interact with to share the content 404.

The pre-sharing insights 408 include those members of the sharing member's social graph who the pre-sharing analytic engine 218 has determined would most likely find the content 404 to be relevant. The pre-sharing insights 408 also include those members who have already shared the content 404. As shown, the pre-sharing insights 408 indicate that 68 "business analysts" within the sharing member's social graph may find the content 404 relevant, and that more than five members have already shared the content 404. These pre-sharing insights 408 inform the sharing member whether to proceed with sharing the content 404. Where the sharing member has an extensive social graph and has a reputation for sharing informative material, the pre-sharing insights 408 are invaluable because they can dissuade the sharing member from sharing the content 404. In instances where the pre-sharing insights 408 are not available, and the content 404 to be shared is actually not relevant to connections within the sharing member's social graph, the sharing member may proceed with sharing the content 404, which can have a detrimental impact on his or her reputation. Such a detrimental impact can also occur where a substantial number of the sharing member's connections have already interacted with and/or shared the content 404. Thus, where the sharing member is striving to provide a platform of meaningful and relatively new content, the pre-sharing insights 408 provide valuable metrics towards this goal.

Given the pre-sharing insights 408, the sharing member can then decide whether to share the content 404. To share the content 404, the sharing member can interact with the element 406, which may cause the application (e.g., the web browser) to communicate an instruction to the social networking server 112 that the sharing member desires to disseminate the content 404 to connections within the sharing member's social graph. In one embodiment, selection of the element 406 causes the application to execute a script on the webpage that causes the application to communicate this instruction.

Figure 5:
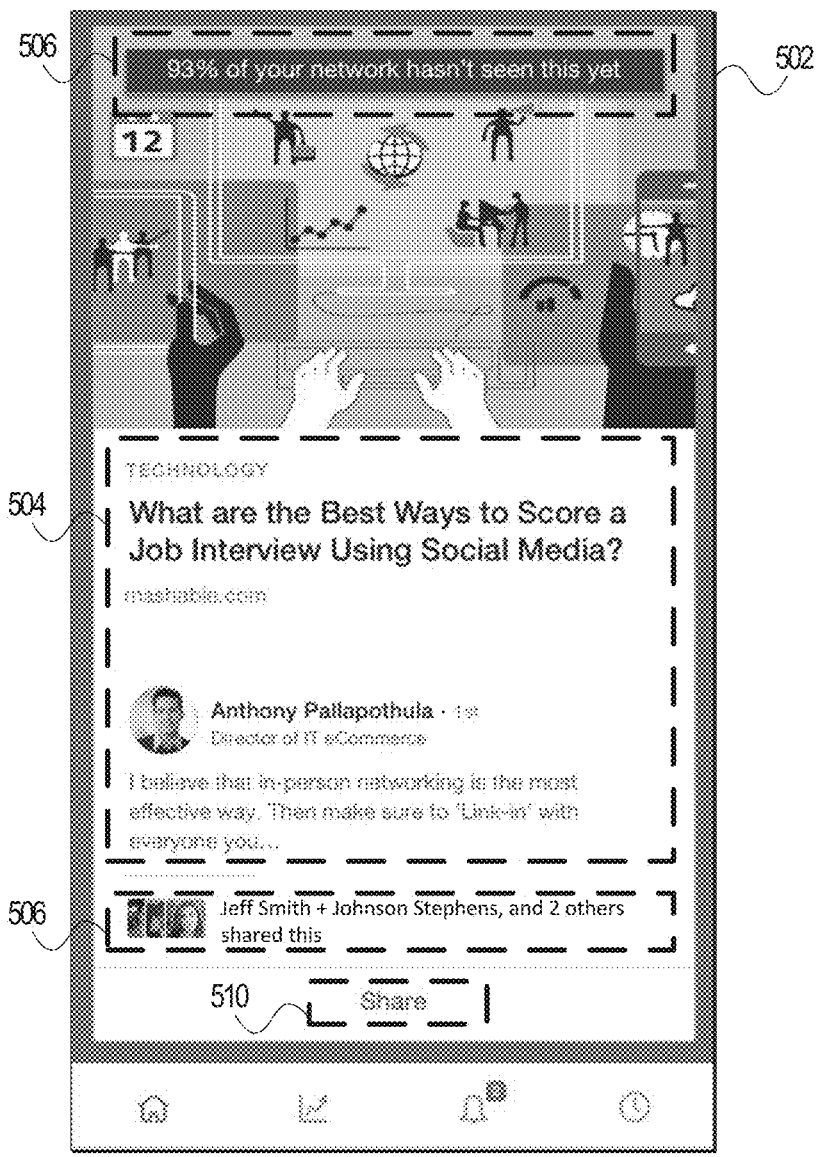
FIG. 5 illustrates a second example of a portion of a graphical user interface having pre-sharing insights, according to an example embodiment.

FIG. 5 illustrates a second example of a portion 502 of a graphical user interface having pre-sharing insights 506, according to an example embodiment. As shown in FIG. 5, the content analytic engine 216 and the pre-sharing analytic engine 218 have determined the various pre-sharing insights 506. A first pre-sharing insight 506 relates to a percentage of members within the sharing member's social graph who have not yet seen content 504 to be shared. As discussed above, the content analytic engine 216 is configured to determine whether the content 504 to be shared has been seen and/or not seen by connections within the sharing member's social graph. In addition, the content analytic engine 216 determines whether other connections within the sharing member's social graph have shared the content 504. Given these pre-sharing insights 506, the sharing member can then decide whether to share the content 504 (e.g., by selecting an element 510 that communicates a sharing instruction to the social networking server 112). When the sharing member elects to share the content to be shared, the social networking server 112 updates one or more databases with the shared content, such as the member profile database 120 (e.g., associating the shared content with the sharing member's member profile) and the shared content database 122 (e.g., creating a new entry for the shared content in the shared content database 122 and associating the sharing member's member profile with the shared content).

Referring back to FIG. 2, after instructing the social networking server 112 to share the provided content, the sharing member may be interested in how his or her connections interacted with the shared content (formerly, the content to be shared). In this regard, the social networking server 112 is configured with a post-sharing analytic engine 220 and an activity monitoring engine 222.

The activity monitoring engine 222 is configured to monitor and/or record member activity with regard to content that has been shared by one or more members. In one embodiment, the activity monitoring engine 222 monitors various channels of interactions performed by members of the social networking service relative to the shared content. These channels include, but are not limited to, a member selecting a hyperlink to the shared content, requesting a webpage that includes the shared content, posting and/or submitting a comment on the shared content, indicating agreement with the shared content (e.g., selecting a "Like" button), and other such interactions or combinations of interactions. In one embodiment, webpages provided by the social networking server 112 include one or more code segments (e.g., scripts) that communicate a message to the activity monitoring engine 222 in response to a member, having viewed the webpage, taking an action on the webpage. The message may include such information as a member profile identifier, the type of action taken, a content identifier indicating the content for which the action occurred, and other such identifying messages indicating the type of activity, the member profile for which the activity occurred, and the content associated with the activity.

As the activity monitoring engine 222 monitors the various channels of interactions, the activity monitoring engine 222 updates the shared content database 122 with the contents of the message relating to the interaction with the corresponding content. In one embodiment, the activity monitoring engine 222 updates the shared content database 122 by writing and/or modifying the global content table and/or the content-specific table with the contents of the message (e.g., the member profile identifier, the type of action taken, etc.). The activity monitoring engine 222 may also update and/or modify the member activity database 116 with the contents of the message associated with the interaction with the shared content.

In monitoring the activity that occurs for content shared by the members of the social networking service, the activity monitoring engine 222 is configured by one or more subsequent action rule(s). The subsequent action rule(s) instruct the activity monitoring engine 222 how many interactions to attribute to a given item of shared content after a member of the social networking service has interacted with such content. In this regard, the activity monitoring engine 222 distinguishes between direct interactions and subsequent interactions. A direct interaction is an interaction that occurs specifically for the shared content. Such direct interactions include selecting a hyperlink that displays the shared content, commenting on the shared content, indicating agreement with the shared content, re-sharing the shared content with other members of the social networking service provided by the social networking server 112, and other such interactions. Subsequent interactions are those interactions that occur after the direct interaction. Such subsequent interactions include, but are not limited to, sending a message to the member who shared the content, requesting to "follow" (e.g., establish a unilateral connection between nodes in a social graph) a member of the social networking service, viewing the member profile of the member who shared the content, and other such subsequent interactions or combinations of interactions. In one embodiment, the subsequent action rule(s) define those interactions that include the direct interactions and those interactions that include the subsequent interactions.

Further still, a subsequent interaction may include any interaction after a direct interaction, such as viewing a member profile of a member who did not share the shared content. In this embodiment, the subsequent action rule(s) specify a subset of specific subsequent interactions that the activity monitoring engine 222 may attribute to the shared content, such as those interactions that relate to an attribute or characteristic that defines the shared content (e.g., the member profile of the member who shared the shared content, the URL from which the shared content was obtained, etc.). In this manner, the activity monitoring engine 222 monitors subsequent interactions by members of the social networking service after a direct interaction has occurred with regard to shared content, but attributes importance to those subsequent interactions that meet the defined criteria or criterion as set out by the subsequent action rule(s).

Furthermore, to limit the attribution of interactions to the shared content, the subsequent action rule(s) may establish an upper bound on the number of subsequent interactions that the activity monitoring engine 222 may attribute to the shared content. In one embodiment, the subsequent action rule(s) specify that the activity monitoring engine 222 is to monitor a predetermined number of subsequent interactions, such as 10 subsequent interactions, after a direct interaction has occurred. This embodiment recognizes that a member viewing shared content may first perform a number of subsequent interactions that do not relate to the shared content (e.g., communicate a message to a member who did not share the shared content), but then later engage in an interaction that relates to the shared content (e.g., request a bilateral connection with the sharing member or "follow" the sharing member). In this embodiment, a subsequent interaction counter may be established for each member profile that performs a direct interaction with content that is shared, and the subsequent interaction counter may be stored in the shared content database 122 and/or the member activity database 116. As a given member engages in subsequent interactions, the activity monitoring engine 222 increments the subsequent interaction counter. Furthermore, in this embodiment, it is conceivable that a single member profile is associated with multiple different subsequent interaction counters, each subsequent interaction counter being associated with different shared content.

Using the activities monitored by the activity monitoring engine 222, the post-sharing analytic engine 220 is configured to compute a number of post-sharing insights (e.g., metrics relating to activities and/or interactions that occur to content that has been shared). The post-sharing insights are stored as the post-sharing insights 230, which are later communicated to the sharing member.

In one embodiment, the post-sharing analytic engine 220 leverages one or more post-sharing analytic rule(s) 226 that instruct the post-sharing analytic engine 220 as to the type of post-sharing insights 230 the post-sharing analytic engine 220 is to determine. These post-sharing analytic rule(s) 226 may instruct the post-sharing analytic engine 220 that the post-sharing insights 230 include those interactions that were direct interactions. Thus, the post-sharing insights 230 may include the number of views associated with content that was shared by a sharing member, the number of "likes" associated with the content shared by the sharing member, the number of re-shares, and other such direct interactions. To determine these metrics, the post-sharing analytic engine 220 may query the member activity database 116 and/or the shared content database 122 with the content identifier assigned to the shared content, and then compute a sum of the number of times that a direct interaction of a given type (e.g., views) occurred associated with the content identifier. Furthermore, as the member activity database 116 and/or the shared content database 122 may include a member profile identifier of a member who engaged in the direct interaction, the post-sharing analytic engine 220 may also produce an output of the members who engaged in the direct interactions with regard to the content shared by the sharing member.

In addition to direct interactions, the post-sharing insights 230 may also include subsequent interactions. In one embodiment, the post-sharing analytic rule(s) 226 specify the metrics relating to the subsequent interactions that are to be included in the post-sharing insights 230. Examples of such metrics include, but are not limited to, the number of members who elected to follow the sharing member, the number of members who elected to view the sharing member's member profile, the number of members who visited the URL associated with the shared content, and other such metrics or combinations of metrics.

In addition, the post-sharing analytic rule(s) 226 may include metrics relating to relative increases in specific types of subsequent interactions, such as profile views of the sharing member's member profile. To determine these relative metrics, the post-sharing analytic engine 220 first determines the number of interactions of the given type of subsequent interaction (e.g., profile views) that occurred for a predetermined time period prior to the sharing member sharing the content (e.g., one week). For example, the post-sharing analytic engine 220 may determine the number of profile views that the sharing member received for one week prior to sharing the content to be shared. The post-sharing analytic engine 220 then determines the number of interactions of the given type of subsequent interaction that occurred for the predetermined time period after the sharing member shared the content. For example, the post-sharing analytic engine 220 may determine the number of profile views that occurred for one week after the sharing member shared the content to be shared. The post-sharing analytic engine 220 can obtain these interactions from the member activity database 116 and/or the shared content database 122, such as by querying the member activity database 116 and/or the shared content database 122 with the sharing member's profile identifier, the interaction type (e.g., profile views), and, where applicable, the content identifier of the shared content.

The post-sharing analytic engine 220 then compares these two values (e.g., the pre-sharing profile views and the post-sharing profile views). Where there is an increase in the post-sharing profile views, the post-sharing analytic engine 220 determines the relative increase. Should there not be an increase in the relative number of the given type of subsequent interaction (e.g., the sharing member's member profile did not experience an increase in the number of profile views after the sharing member shared the content), the post-sharing analytic rule(s) 226 may instruct the post-sharing analytic engine 220 not to communicate this information to the sharing member. Accordingly, the post-sharing analytic rule(s) 226 may instruct the post-sharing analytic engine 220 to communicate post-sharing insights 230 that include relative metrics where there is an increase in such relative metrics. In this manner, the post-sharing analytic engine 220 is configured to provide post-sharing insights to the sharing member, which inform the sharing member of the impact his or her shared content may have had on his or her social network.

Figure 6:
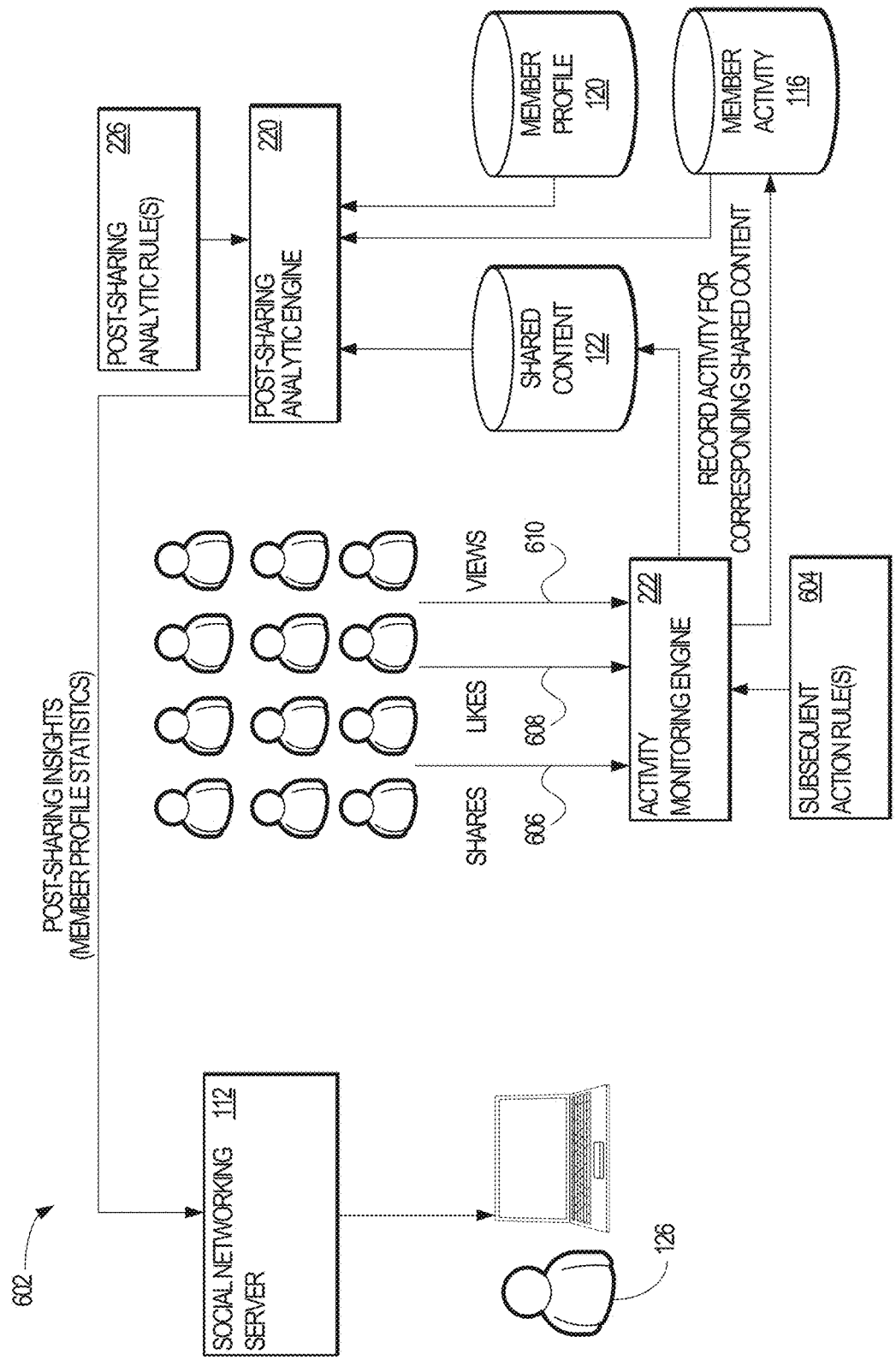
FIG. 6 illustrates a process of generating post-sharing insight analytics using the various components of the social networking server of FIG. 2, according to an example embodiment.

FIG. 6 illustrates a process 602 of generating post-sharing insights using the various components of the social networking server 112 of FIG. 2, according to an example embodiment. As shown in FIG. 6, the activity monitoring engine 222 monitors various interaction channels 606-610 as members of the social networking service interact with content that has been shared by a sharing member (e.g., user 126 in FIG. 6). As discussed above, the activity monitoring engine 222 may monitor both direct interactions and subsequent interactions. In one embodiment, the interaction channels include a re-sharing channel 606, a like channel 608, and a view channel 610. However, the interaction channels may also include a follow channel (e.g., indicating that a member has followed the sharing member's member profile), a messaging channel (e.g., indicating that a member has communicated a message to the sharing member), and other such interaction channels or combinations of interaction channels.

The activity monitoring engine 222 is configured to update the shared content database 122 and/or the member activity database 116 with interactions monitored by the activity monitoring engine 222. As discussed above, subsequent action rule(s) 604 may define an upper bound on the number of subsequent interactions the activity monitoring engine 222 is to monitor and, further still, may specify which subsequent interactions are recorded in the member activity database 116 and/or shared content database 122.

The post-sharing analytic engine 220 then determines one or more post-sharing insights based on the direct and/or subsequent interactions monitored by the activity monitoring engine 222. In one embodiment, the post-sharing analytic rule(s) 226 specify the post-sharing insights that the post-sharing analytic engine 220 is to determine and the manner in which the post-sharing analytic engine 220 is to make these determinations.

Moreover, the post-sharing analytic rule(s) 226 may specify the time intervals and/or conditions under which the post-sharing analytic engine 220 is to determine the post-sharing insights. In one embodiment, the post-sharing analytic rule(s) 226 specify that the post-sharing analytic engine 220 is to determine the post-sharing insights at predetermined time intervals, such as at one-day intervals, at three-day intervals, at one-week intervals, or at any other predetermined time intervals or combination of time intervals. Additionally, and/or alternatively, the post-sharing analytic rule(s) 226 may specify that the post-sharing analytic engine 220 is to determine the post-sharing insights when one or more predetermined conditions are satisfied. Examples of such predetermined conditions include, but are not limited to, the sharing member logging into his or her member profile with the social networking service, the sharing member selecting a hyperlink or other element displayed on a webpage, a post-sharing insight exceeding a predetermined threshold, or other such predetermined conditions or combinations of predetermined conditions.

Having determined one or more post-sharing insights according to the post-sharing analytic rule(s) 226, the post-sharing analytic engine 220 communicates the post-sharing insights to the sharing member (e.g., user 126 via the social networking server 112). In one embodiment, the post-sharing insights are displayed on a webpage or other graphical user interface for interacting with the social networking service. For example, the post-sharing insights may be displayed as one or more graphics, texts, or animations, or in other such visual formats. In addition, the post-sharing insights may be displayed in a dedicated or selected portion of a webpage displayable to the sharing member.

Figure 7:
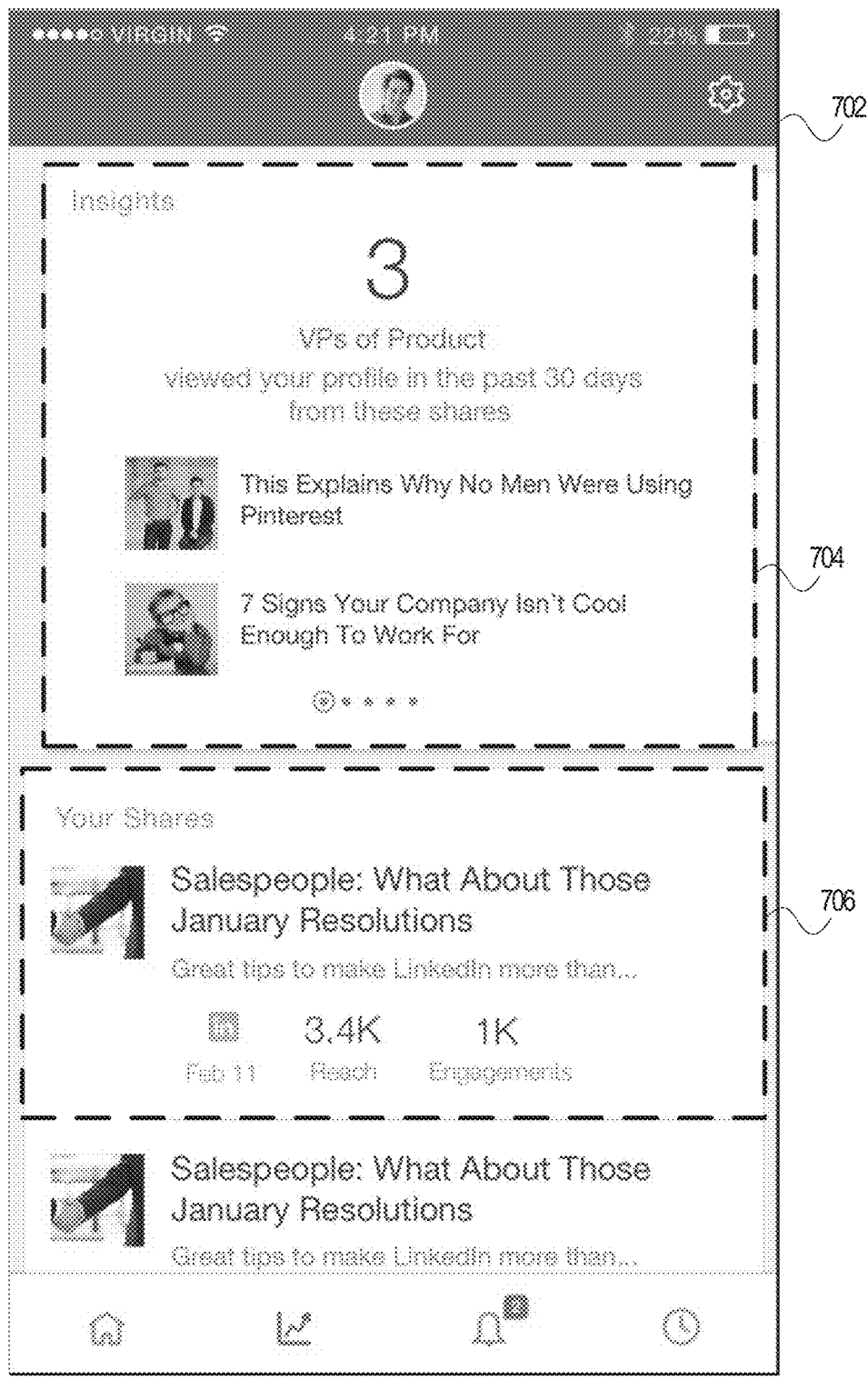
FIG. 7 illustrates an example of a portion of a graphical user interface having post-sharing insight analytics, according to an example embodiment.
Figure 8D:
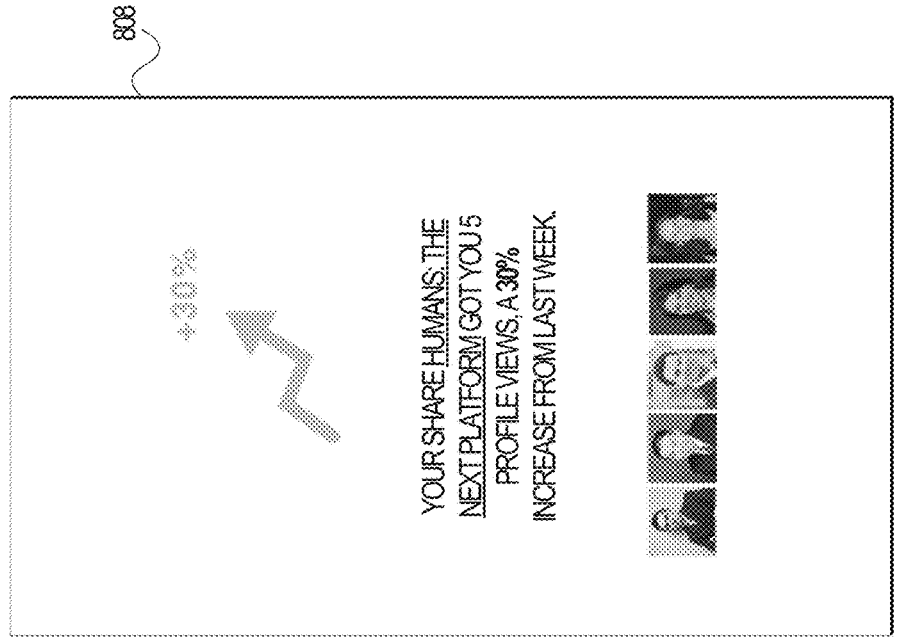
Figure 8C:
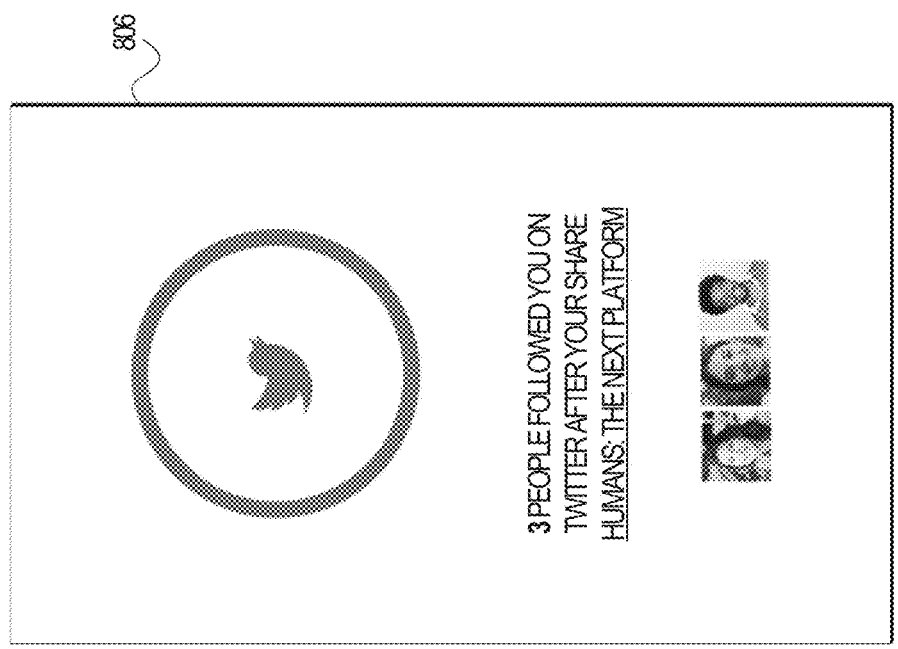

FIG. 7 illustrates an example of a portion 702 of a graphical user interface having post-sharing insights, according to an example embodiment. As shown in FIG. 7, the portion 702 includes post-sharing insights 704-706 that provide a measurement of the impact that a sharing member has had on his or her social network by sharing different items of content. In a first example, the post-sharing insight 704 indicates that three members associated with an Employment attribute value of "VPs of Product" have viewed the sharing member's profile (e.g., engaged in a subsequent interaction) after having performed a direct interaction on two different items of content.

As discussed above, the post-sharing analytic engine 220 is configured to determine this post-sharing insight 704 based on the monitoring performed by the activity monitoring engine 222 and the updates to the shared content database 122 and/or the member activity database 116. In the case of the post-sharing insight 704, a subsequent action rule (e.g., of the subsequent action rule(s) 604) has been configured to monitor and combine the activities for two items of content shared by the sharing member. In this regard, a subsequent action rule may be configured that instructs the activity monitoring engine 222 to combine the monitoring of activities for items of content that are similar according to the topics assigned to the respective items of content by the content analytic engine 216. For example, the subsequent action rule may specify that, where one or more items of content share a threshold number and/or percentage of topics (e.g., have the same topics assigned), the activity monitoring engine 222 is to aggregate the subsequent interactions that occur for the topically similar shared items of content. In this manner, the subsequent interactions for multiple instances of shared content can be compiled into a single metric that indicates the impact that such shared content had on a sharing member's social network.

The post-sharing insight 706 provides several different metrics relating to an item of shared content. In particular, the post-sharing insight 706 indicates the number of members who received a notification of the shared content (e.g., 3,400 members) and the number of members who performed a direct interaction for the shared content (e.g., 1,000 members). In one embodiment, a post-sharing analytic rule of the post-sharing analytic rule(s) 226 instructs the post-sharing analytic engine 220 to determine a measurement of the number of members who may have received a notification of the shared content. The post-sharing analytic engine 220 may determine this metric by querying the member activity database 116 using the content identifier associated with the shared content, and totaling the number of members who received a notification that the shared content was available for viewing. Additionally, and/or alternatively, the post-sharing analytic engine 220 may query the shared content database 122 for this information using the content identifier assigned to the shared content.

As explained previously, the post-sharing analytic engine 220 may display a webpage where a portion of the webpage includes one or more post-sharing insights. FIGS. 8A-8D illustrate examples 802-808 of displayable content having post-sharing insights, according to example embodiments. The examples 802-808 illustrated in FIGS. 8A-8D may be displayed in a designated portion of a webpage displayable to the sharing member. Furthermore, each of the examples 802-808 includes one or more post-sharing insights determined by the post-sharing analytic engine 220. In particular, the example 802 includes several post-sharing insights 810, which include the number of times the shared content was re-shared, the number of times the shared content was "liked" by other members, and the number of times the shared content was viewed by other members of the social networking service. As the examples 802-808 are compact and provide a summary of one or more given post-sharing insights, any one of the examples may occupy a minimal amount of a webpage so as not to be obtrusive, but yet provide content that is informative to the sharing member.

Figure 9A:
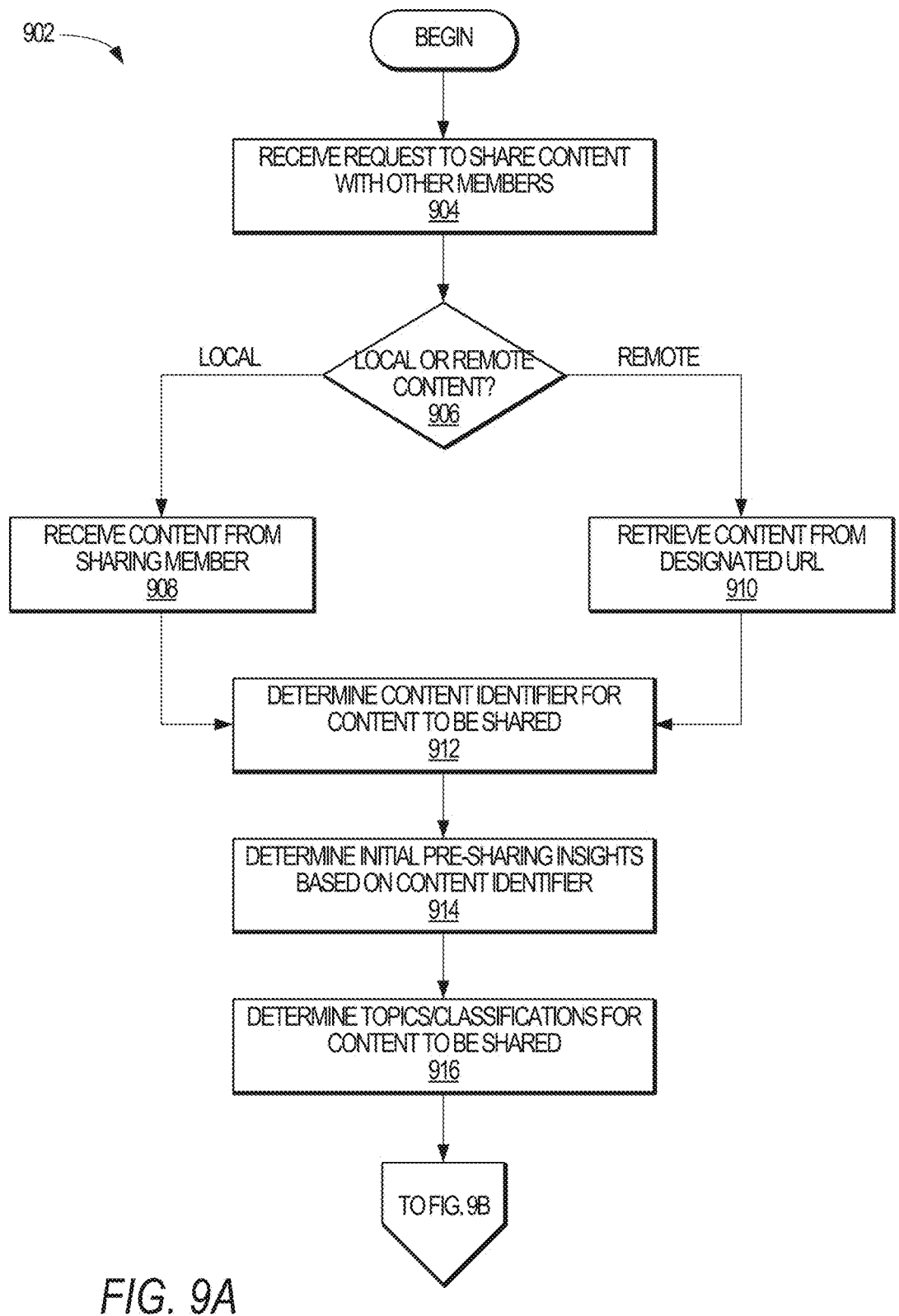
FIGS. 9A-9B illustrate a method, in accordance with an example embodiment, of determining one or more pre-sharing insights using the social networking server of FIG. 2.
Figure 9B:
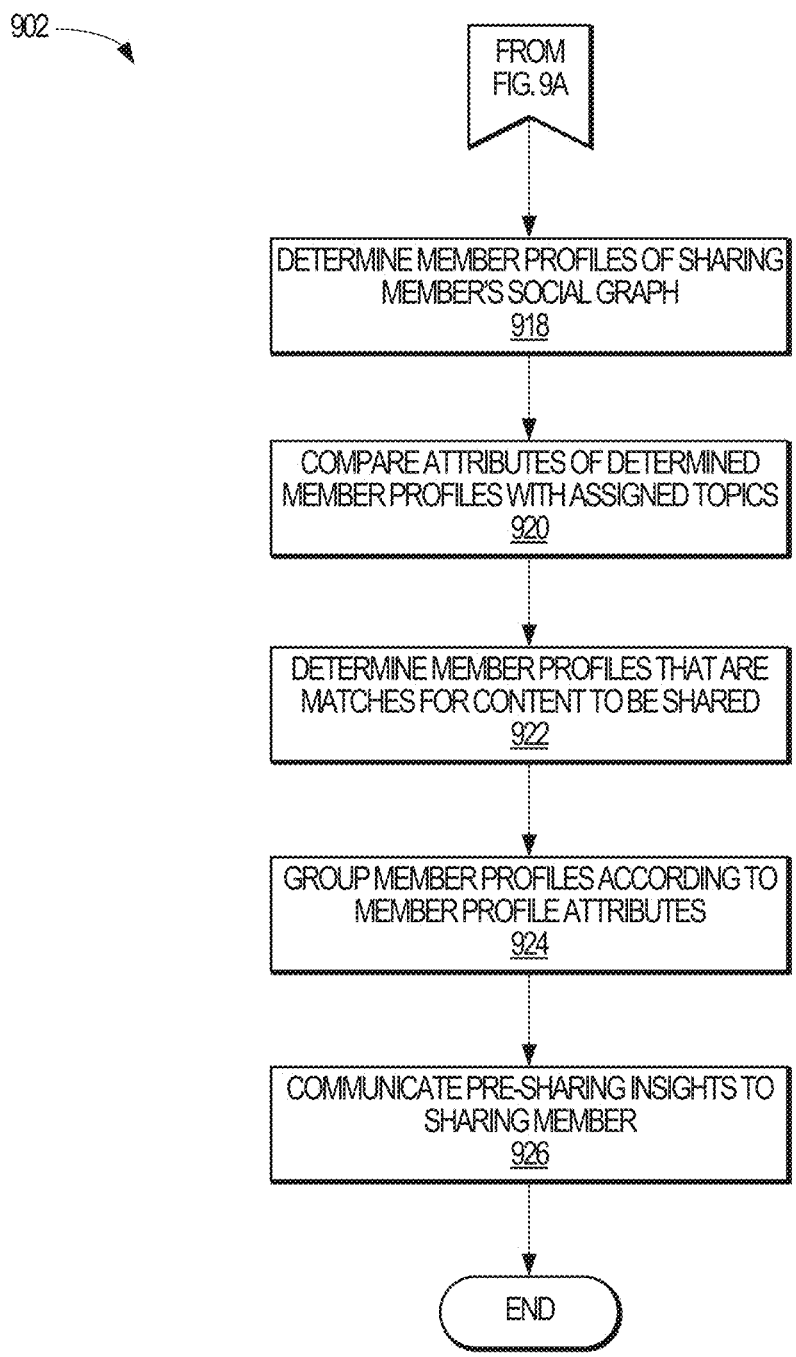

FIGS. 9A-9B illustrate a method 902, in accordance with an example embodiment, of determining one or more pre-sharing insights using the social networking server 112 of FIG. 2. The method 902 may be implemented by one or more of the components of the social networking server 112 of FIG. 2, and is discussed by way of reference thereto.

Referring initially to FIG. 9A, the social networking server 112 receives a request by a member of a social networking service to share content with other members of the member's social network (Operation 904). As discussed above, the social networking server 112 may provide a graphical user interface, such as a webpage, for the sharing member to designate the content that he or she desires to share with others.

The sharing member then communicates the content to be shared to the social networking server 112. Accordingly, the social networking server 112 receives a notification of whether the content to be shared is local (e.g., resides on a client device being used by the sharing member) or is provided by a third-party entity (e.g., another website) (Operation 906). Where the content to be shared is local (e.g., the "LOCAL" branch of Operation 906), the social networking server 112 receives the content to be shared from the sharing member (Operation 908). As explained above, the content to be shared may be communicated to the social networking server 112 using one or more communication protocols, such as HTTP, FTP, or other such communication protocols or combinations of protocols. Where the content to be shared is remote (e.g., the "REMOTE" branch of Operation 906), the social networking server 112 retrieves the content to be shared from a designated URL using the content retrieval engine 212 (Operation 910).

The social networking server 112 may then determine a content identifier for the content to be shared (Operation 912). In one embodiment, the content identification engine 214 determines the content identifier for the content to be shared using one or more cryptographic hashing functions such as an MD5 hash function, an MD6 hash algorithm, a SHA-1 hash function, or any other such cryptographic hash function now known or later developed. Furthermore, the content identification engine 214 may use one or more characteristics of the content to be shared as input to the cryptographic hashing function, such as the URL of the content to be shared, a binary representation of the content to be shared, the text of the content to be shared, a histogram of the content to be shared, or any other such characteristic or combination of characteristics. In one embodiment, the characteristic used as input to the cryptographic hashing function depends on whether the content to be shared is provided by the client device to the social networking server 112 or retrieved from a URL by the content retrieval engine 212. Where the content to be shared is provided by the client device, the characteristic used as input to the cryptographic hashing function may depend on the type of content to be shared.

The content analytic engine 216 then determines an initial set of pre-sharing insights based on the content identifier determined for the content to be shared (Operation 914). As explained previously with reference to FIGS. 2-3, these initial pre-sharing insights may include whether other members of the sharing member's social network have previously shared the content to be shared, whether (and/or which) members in the sharing member's social network have previously viewed or otherwise interacted with, the content to be shared, and other such initial pre-sharing insights. These pre-sharing insights are considered initial pre-sharing insights because they may be performed prior to the content analytic engine 216 having assigned one or more topics to the content to be shared. In alternative embodiments, these initial pre-sharing insights may be determined and/or communicated at approximately the time the pre-sharing insights are determined by the pre-sharing analytic engine 218.

The content analytic engine 216 then assigns one or more topics (e.g., classifications) to the content to be shared (Operation 916). As discussed above with reference to FIGS. 2-3, the content analytic engine 216 may assign one or more topics to the content to be shared using various topics stored in a topic database 304 and one or more classification techniques (e.g., supervised and/or unsupervised classification techniques). The result of the processing performed by the content analytic engine 216 is one or more topics that describe and/or relate to the content to be shared. The benefit of assigning the topics to the content to be shared is that they provide context to the content to be shared and facilitate the determination of one or more members who may find the content to be shared relevant to their interests.

Continuing to FIG. 9B, the pre-sharing analytic engine 218 then determines one or more member profiles within the sharing member's social network (Operation 918). As explained above, the pre-sharing analytic engine 218 may traverse the sharing member's social graph, identifying nodes that correspond to member profiles. In addition, an upper bound may be placed on the number of degrees the pre-sharing analytic engine 218 is to traverse to prohibit the pre-sharing analytic engine 218 from endlessly traversing the sharing member's social graph.

Using the determined member profiles, the pre-sharing analytic engine 218 then compares one or more member profile attribute values of the determined member profiles with the topics assigned to the content to be shared (Operation 920). The pre-sharing analytic engine 218 accordingly determines which member profiles are matches for the content to be shared based on this comparison (Operation 922). In one embodiment, a member profile is determined to match with the content to be shared when there is at least one match between a member profile attribute value of the member profile and a topic assigned to the content to be shared. In another embodiment, a member profile is determined to match with the content to be shared when there is a threshold number of matches between one or more member profile attribute values and one or more topics assigned to the content to be shared.

The pre-sharing analytic engine 218 may then group one or more member profiles according to one or more member profile attributes (Operation 924). For example, the member profiles may be grouped according to an Employment attribute, a Skills attribute, an Industry attribute, or any other such member profile attribute. The pre-sharing analytic engine 218 then determines one or more pre-sharing insights according to the groupings of member profiles. In one embodiment, the pre-sharing insights may include the largest group of member profiles that match with the content to be shared, a match percentage indicating the number of member profiles that matched with the content to be shared from among the number of member profiles within the sharing member's social network, the specific member profiles that matched with the content to be shared, and any other such pre-sharing insight or combinations of pre-sharing insights. The logic for determining such pre-sharing insights is within the knowledge of one of ordinary skill in the art of statistics.

The pre-sharing analytic engine 218 then communicates the determined one or more pre-sharing insights (e.g., pre-sharing insights 228) to the sharing member (Operation 926). As discussed above, FIGS. 4-5 illustrate examples of portions of a webpage that display pre-sharing insights (e.g., the pre-sharing insights 408 of FIG. 4 and the pre-sharing insights 506 of FIG. 5.).

Figure 10:
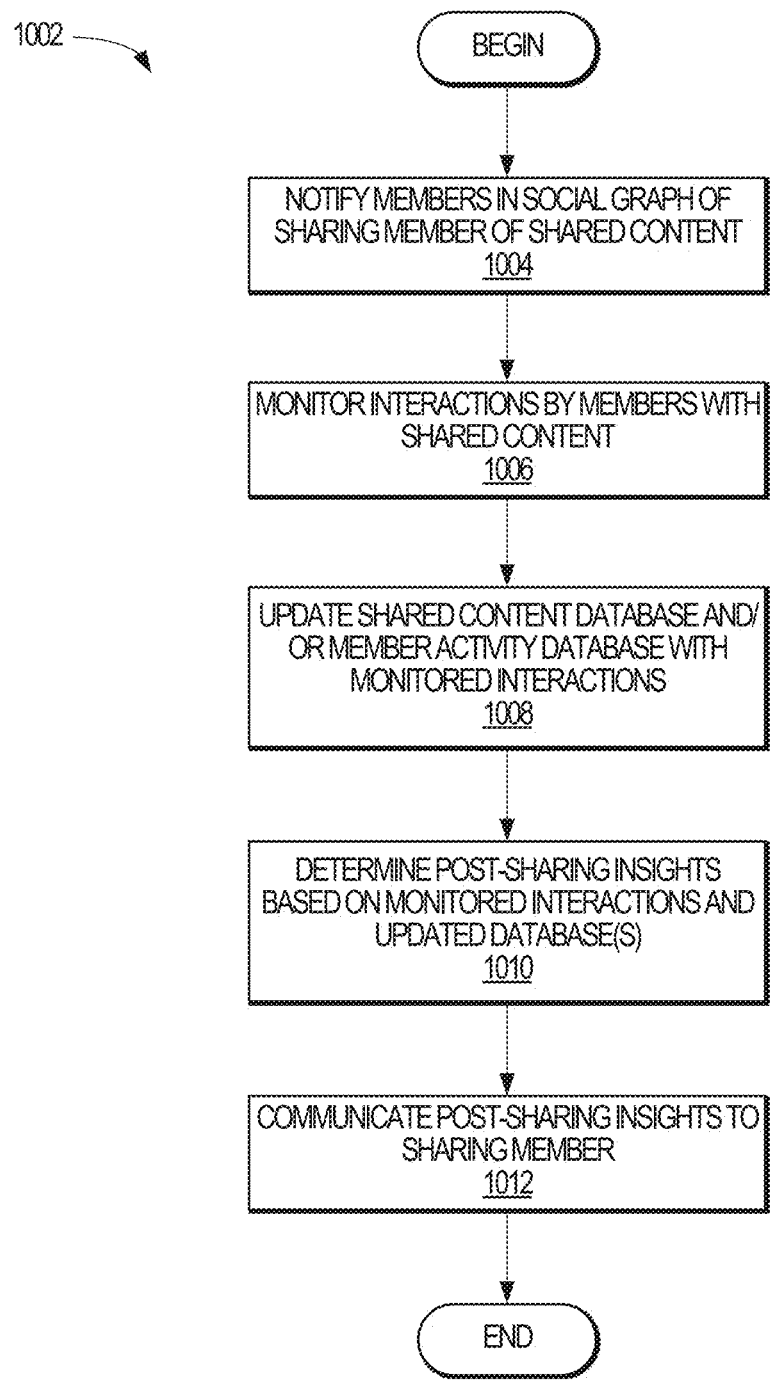
FIG. 10 illustrates a method, in accordance with an example embodiment, of determining one or more post-sharing insights using the social networking server of FIG. 2.

FIG. 10 illustrates a method 1002, in accordance with an example embodiment, of determining one or more post-sharing insights using the social networking server 112 of FIG. 2. The method 1002 may be implemented by one or more of the components illustrated in FIGS. 2-3 and is discussed by way of reference thereto.

After the sharing member has opted to share the content to be shared (e.g., by selecting the element 406 of FIG. 4), the social networking server 112 disseminates the content to be shared to one or more members within the social network of the sharing member (e.g., nodes of the sharing member's social graph) (Operation 1004). In one embodiment, the other members receive a notification and/or a summary of the shared content within a portion of a webpage that the social networking server 112 provides to the other members. In addition, the social networking server 112 updates one or more databases, such as the member profile database 120 and the shared content database 122, to include relevant information about the shared content, such as the content identifier, the URL of the content, the member profile of the member who shared the content, when the member shared the content, and other such information.

The activity monitoring engine 222 then monitors interactions with the shared content by members of the sharing member's social network (Operation 1006). As discussed above, interactions with the shared content include direct interactions (e.g., viewing, re-sharing, commenting on, "liking," etc.) and subsequent interactions (e.g., interactions occurring after a direct interaction with the shared content). As subsequent and/or direct interactions occur relative to the shared content, the activity monitoring engine 222 updates one or more databases to reflect those interactions, such as the shared content database 122 and/or the member activity database 116 (e.g., as illustrated in FIG. 6) (Operation 1008).

The post-sharing analytic engine 220 then determines one or more post-sharing insights based on the monitored interactions and/or the updated databases 116, 122 (Operation 1010). As discussed above, examples of the post-sharing insights are illustrated in FIG. 7 and FIGS. 8A-8D. The post-sharing insights include statistical metrics relating to the interactions with the shared content by members of the sharing member's social network. In one embodiment, the post-sharing insights include the number of direct interactions with the shared content, the number of specific types of subsequent interactions (e.g., the number of profile views occurring after a direct interaction with the shared content), the members (via their corresponding member profiles) who performed a direct interaction with the shared content, the members who performed a specific subsequent interaction (e.g., sent the sharing member a message) after directly interacting with the shared content, and other such post-sharing insights or combinations of post-sharing insights. The logic for configuring the post-sharing analytic engine 220 is within the knowledge of one of ordinary skill in the arts of statistics, database management, and/or mathematics.

The determined post-sharing insights (e.g., post-sharing insights 230) are then communicated to the sharing member (Operation 1012). In one embodiment, the post-sharing insights are displayed on a webpage or a portion thereof.

In this manner, this disclosure provides for a system, method, and computer-readable medium for determining pre-sharing insights relating to content to be shared and for determining post-sharing insights relating to content that has been shared. One of the technical problems addressed by this disclosure relates to whether members of a sharing member's social network have previously seen content to be shared or whether such content would be relevant to those members' interests. As a sharing member typically does not have access to the web browsing habits of his or her social network connections, the sharing member cannot know whether his or her connections have previously viewed (or otherwise interacted with) content that he or she desires to share. Thus, this disclosure provides a cooperative architecture whereby a shared content database maintains a record of content shared (or otherwise interacted with) by others, and a content analytic engine configured to access and retrieve specific information from this database.

In addition, this disclosure addresses the technical problem of knowing what content other members of a sharing member's social network have interacted with, and what interactions such members may have subsequently engaged in as a result of interacting with such content. This problem is technical because the sharing member typically does not have access to knowledge about which content other members of his or her social network may have interacted with. Furthermore, a conventional client device (e.g., a desktop computer, smartphone, etc.) typically lacks such programming or configuration. To address this problem, this disclosure also provides a cooperative architecture whereby specifically configured engines of a social networking server 112 monitor activities by other members of a sharing member's social network, and compute metrics (which the sharing member does not have access to) relating to such activities which are then communicated to the sharing member.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as an FPGA or an ASIC. A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-10 are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Example Machine Architecture and Machine-Readable Medium

Figure 11:
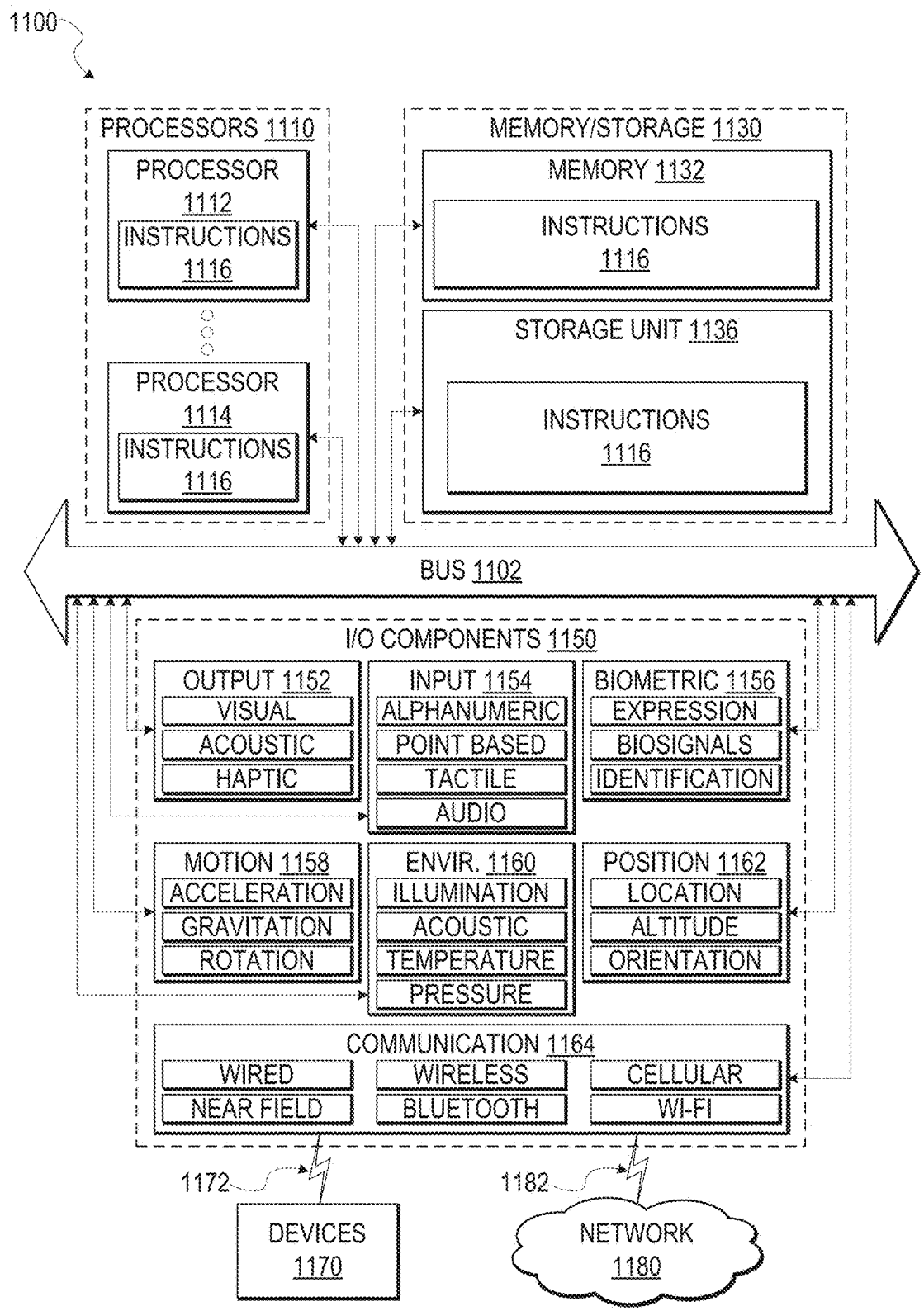
FIG. 11 is a block diagram illustrating components of a machine, according to some example embodiments, able to read instructions from a machine-readable medium (e.g., a machine-readable storage medium) and perform any one or more of the methodologies discussed herein.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute the processes illustrated in FIG. 3 and FIG. 6. Additionally, or alternatively, the instructions 1116 may implement one or more of the components of FIG. 2. Additionally, and/or alternatively, the instructions 1116 may implement one or more of the algorithms illustrated in FIGS. 9A-10. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a personal digital assistant (PDA), or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory/storage 1130, and I/O components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1112 and a processor 1114 that may execute the instructions 1116. The term "processor" is intended to include multi-core processors that may comprise two or more independent processors (sometimes referred to as "cores") that may execute the instructions 1116 contemporaneously. Although FIG. 11 shows multiple processors 1110, the machine 1100 may include a single processor with a single core, a single processor with multiple cores (e.g., a multi-core processor), multiple processors with a single core, multiple processors with multiples cores, or any combination thereof.

The memory/storage 1130 may include a memory 1132, such as a main memory, or other memory storage, and a storage unit 1136, both accessible to the processors 1110 such as via the bus 1102. The storage unit 1136 and memory 1132 store the instructions 1116 embodying any one or more of the methodologies or functions described herein. The instructions 1116 may also reside, completely or partially, within the memory 1132, within the storage unit 1136, within at least one of the processors 1110 (e.g., within the processor's cache memory), or any suitable combination thereof, during execution thereof by the machine 1100. Accordingly, the memory 1132, the storage unit 1136, and the memory of the processors 1110 are examples of machine-readable media.

As used herein, "machine-readable medium" means a device able to store the instructions 1116 and data temporarily or permanently and may include, but is not limited to, RAM, ROM, buffer memory, flash memory, optical media, magnetic media, cache memory, other types of storage (e.g., EEPROM), and/or any suitable combination thereof. The term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion, and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162 among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1162 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172 respectively. For example, the communication components 1164 may include a network interface component or other suitable device to interface with the network 1180. In further examples, the communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a USB).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF416, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1180 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1180 or a portion of the network 1180 may include a wireless or cellular network and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., HTTP). Similarly, the instructions 1116 may be transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

We claim:

1. A system comprising:
a machine-readable memory storing computer-executable instructions; and
one or more hardware processors in communication with the machine-readable memory that, having executed the computer-executable instructions, configure the system to:
monitor a first plurality of interactions by one or more members of a social networking service with content having been shared by a first member, wherein each interaction of the first plurality of interactions is associated with an interaction type;
determine whether a predetermined condition associated with the first plurality of interactions has been satisfied, wherein the predetermined condition specifies when a plurality of post-sharing insights are to be determined and the post-sharing insights are associated with the first plurality of interactions;
in response to a determination that the predetermined condition has been satisfied, determine the plurality of post-sharing insights, at least one post-sharing insight based on an interaction type selected from the first plurality of interactions; and
generate a graphical user interface for viewing by the first member, the graphical user interface comprising at least one determined post-sharing insight selected from the plurality of post-sharing insights.

2. The system of claim 1, wherein the first plurality of interactions include direct interactions with the content having been shared by the first member, a direct interaction comprising at least one interaction where the one or more members directly interact with the content having been shared.

3. The system of claim 2, wherein the direct interactions including at least one interaction of sharing the content having been shared, viewing the content having been shared, and liking the content having been shared.

4. The system of claim 1, wherein the first plurality of interactions include subsequent interactions with the content having been shared by the first member, a subsequent interaction comprising an interaction with the content having been shared subsequent to a direct interaction with the content having been shared; and
the system is further configured to execute at least one subsequent action rule that specifies whether an interaction with the content having been shared is a subsequent interaction.

5. The system of claim 4, wherein the at least one subsequent action rule comprises an upper bound on the number of subsequent interactions that are to be attributed to the content having been shared.

6. The system of claim 1, wherein the system is further configure to:
cause a display of the content having been shared by the first member via a webpage, the webpage comprising one or more code segments that perform the monitoring of the first plurality of interactions and communicate the instances of the first plurality of interactions to the system.

7. The system of claim 1, wherein the interaction types of the first plurality of interactions comprises at least two different types of interactions; and
the system is further configured to:
execute one or more post-sharing analytic rules that distinguish between the different types of interactions, wherein the post-sharing analytic rules specify those types of interactions that are to be used in determining the plurality of post-sharing insights.

8. The non-transitory, machine-readable medium of claim 1, wherein the at least one subsequent action rule comprises an upper bound on the number of subsequent interactions that are to be attributed to the content having been shared.

9. A non-transitory, machine-readable medium storing computer-executable instructions that, when executed by one or more hardware processors, cause the one or more hardware processors to perform a plurality of operations comprising:
monitoring a first plurality of interactions by one or more members of a social networking service with content having been shared by a first member, wherein each interaction of the first plurality of interactions is associated with an interaction type;
determining whether a predetermined condition associated with the first plurality of interactions has been satisfied, wherein the predetermined condition specifies when a plurality of post-sharing insights are to be determined and the post-sharing insights are associated with the first plurality of interactions;
in response to a determination that the predetermined condition has been satisfied, determining the plurality of post-sharing insights, at least one post-sharing insight based on a first type of interaction selected from the first plurality of interactions; and
generating a graphical user interface for viewing by the first member, the graphical user interface comprising at least one determined post-sharing insight selected from the plurality of post-sharing insights.

10. The non-transitory, machine-readable medium of claim 9, wherein the first plurality of interactions include direct interactions with the content having been shared by the first member, a direct interaction comprising at least one interaction where the one or more members directly interact with the content having been shared.

11. The non-transitory, machine-readable medium of claim 10, wherein the direct interactions including at least one interaction of sharing the content having been shared, viewing the content having been shared, and liking the content having been shared.

12. The non-transitory, machine-readable medium of claim 9, wherein the first plurality of interactions include subsequent interactions with the content having been shared by the first member, a subsequent interaction comprising an interaction with the content having been shared subsequent to a direct interaction with the content having been shared; and
the plurality of operations further comprises executing at least one subsequent action rule that specifies whether an interaction with the content having been shared is a subsequent interaction.

13. The non-transitory, machine-readable medium of claim 9, wherein the plurality of operations further comprises:

causing a display of the content having been shared by the first member via a webpage, the webpage comprising one or more code segments that perform the monitoring of the first plurality of interactions and communicate the instances of the first plurality of interactions to the system.

14. The non-transitory, machine-readable medium of claim 9, wherein the interaction types of the first plurality of interactions comprises at least two different types of interactions; and the plurality of operations further comprises:
executing one or more post-sharing analytic rules that distinguish between the different types of interactions, wherein the post-sharing analytic rules specify those types of interactions that are to be used in determining the plurality of post-sharing insights.

* * * * *